(12) United States Patent
Hatanaka

(10) Patent No.: US 12,218,774 B2
(45) Date of Patent: Feb. 4, 2025

(54) COMMUNICATION SYSTEM AND COMPUTER-READABLE STORAGE MEDIUM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Issei Hatanaka, Kanagawa (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 18/458,326

(22) Filed: Aug. 30, 2023

(65) Prior Publication Data

US 2023/0403177 A1    Dec. 14, 2023

Related U.S. Application Data

(63) Continuation of application No. PCT/JP2022/009983, filed on Mar. 8, 2022.

(30) Foreign Application Priority Data

Mar. 19, 2021  (JP) ................. 2021-046360

(51) Int. Cl.
*H04L 12/22* (2006.01)
*H04L 9/40* (2022.01)
(Continued)

(52) U.S. Cl.
CPC .............. *H04L 12/22* (2013.01); *H04L 12/66* (2013.01); *H04L 41/40* (2022.05); *H04L 63/12* (2013.01); *H04L 63/126* (2013.01)

(58) Field of Classification Search
CPC .......... H04L 12/22; H04L 12/66; H04L 41/40; H04L 43/026; H04L 63/12; H04L 63/126; H04L 9/3263; H04L 63/0823; G06F 13/00
See application file for complete search history.

(56) References Cited

U.S. PATENT DOCUMENTS

| 9,397,982 B2 | 7/2016 | Ignatchenko |
| 11,252,057 B2 | 2/2022 | Imamoto |

(Continued)

FOREIGN PATENT DOCUMENTS

| EP | 2 452 466 B1 | 1/2021 |
| JP | 2005-73033 A | 3/2005 |

(Continued)

OTHER PUBLICATIONS

Japan Patent Office, International Search Report for PCT/JP 2022/009983, 2 pages, and translation, 2 pages (May 31, 2022).

(Continued)

*Primary Examiner* — Tonia L Dollinger
*Assistant Examiner* — Joseph M Cousins
(74) *Attorney, Agent, or Firm* — Finnegan, Henderson, Farabow, Garrett & Dunner, LLP

(57) ABSTRACT

According to an embodiment, a communication system includes a first communication control apparatus connected between a network connection apparatus and a first client apparatus, a second communication control apparatus connected between the network connection apparatus and a second client apparatus, and a communication control management apparatus that is connected to the network connection apparatus and manages communication by the first communication control apparatus and second communication control apparatus. The communication control management apparatus monitors communication based on manage- (Continued)

ment information defining regular communication between the first client apparatus and the second client apparatus as communication by the first packet including the first virtual tag, and defining regular communication between the communication control management apparatus and the first communication control apparatus or second communication control apparatus as communication by the second packet including the second virtual tag.

9 Claims, 10 Drawing Sheets

(51) Int. Cl.
  *H04L 12/66* (2006.01)
  *H04L 41/40* (2022.01)

(56) References Cited

U.S. PATENT DOCUMENTS

| | | |
|---|---|---|
| 11,431,706 B2 | 8/2022 | Tomoeda et al. |
| 2006/0026669 A1 | 2/2006 | Zakas |
| 2012/0163388 A1 | 6/2012 | Goel et al. |
| 2018/0103092 A1 | 4/2018 | Watanabe et al. |
| 2018/0337849 A1* | 11/2018 | Sharma ............... H04L 65/1069 |
| 2020/0204549 A1 | 6/2020 | Tomoeda et al. |
| 2021/0273952 A1 | 9/2021 | Ishihara |
| 2021/0400026 A1 | 12/2021 | Hatanaka |

FOREIGN PATENT DOCUMENTS

| | | | |
|---|---|---|---|
| JP | 2005-142944 A | 6/2005 | |
| JP | 2008-508805 A | 3/2008 | |
| JP | 2012-533231 A | 12/2012 | |
| JP | 2019-50485 A | 3/2019 | |
| JP | 2020-14089 A | 1/2020 | |
| JP | 6644037 B2 * | 2/2020 | ............ F01N 1/083 |
| JP | 2020-145496 A | 9/2020 | |
| JP | 2020-150430 A | 9/2020 | |
| WO | WO 2020/179706 A1 | 9/2020 | |

OTHER PUBLICATIONS

Intellectual Property Office of Singapore, Notice for Eligibility of Grant in SP App. No. 11202306382W, 5 pages (Nov. 1, 2024).
European Patent Office, Extended European Search Report in EP App. No. 22771191.8, 9 pages (Dec. 17, 2024).

* cited by examiner

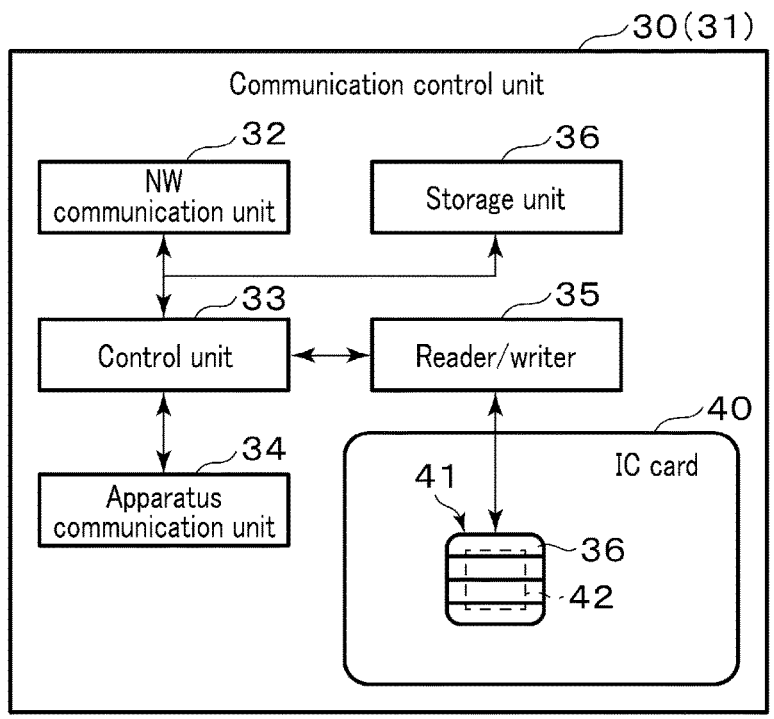
F I G. 3
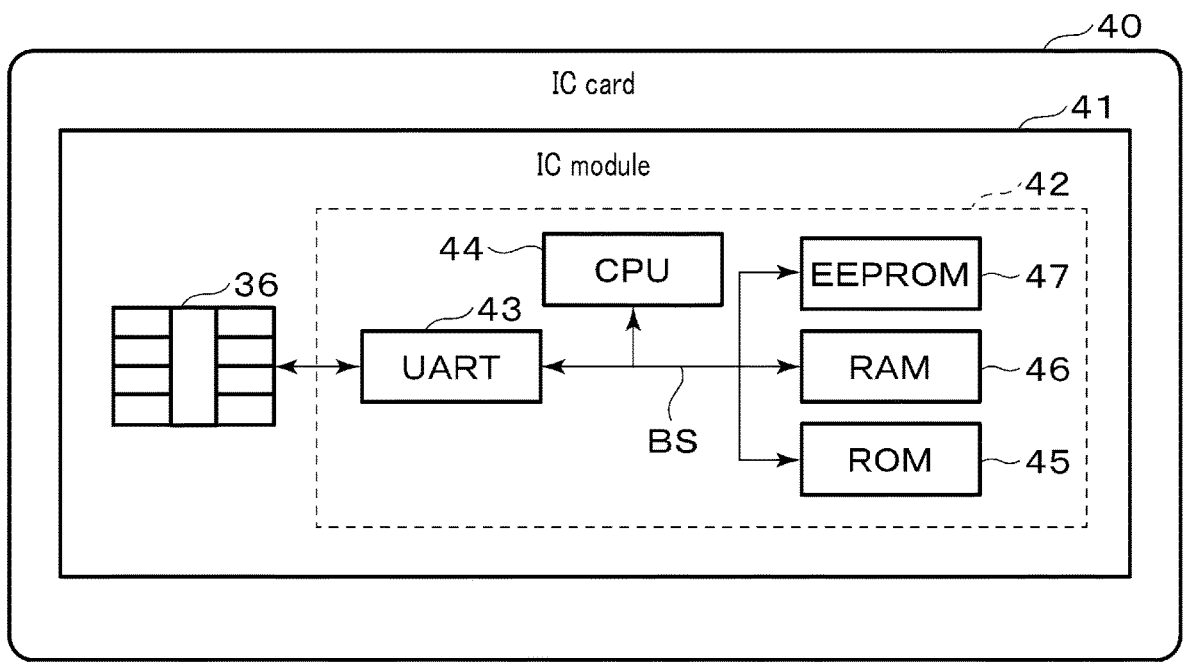
F I G. 4

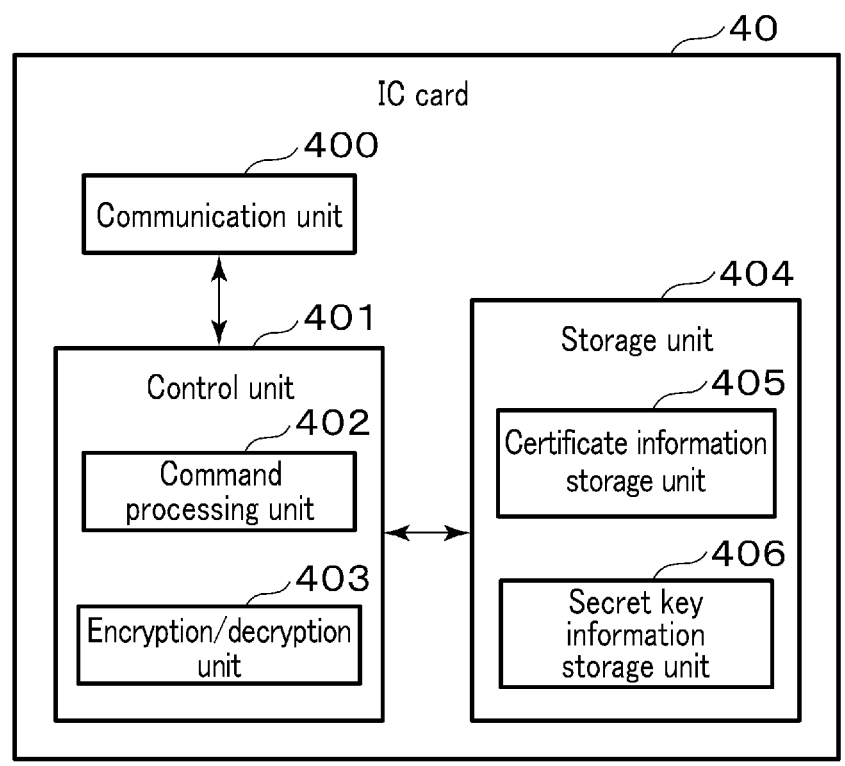
F I G. 5

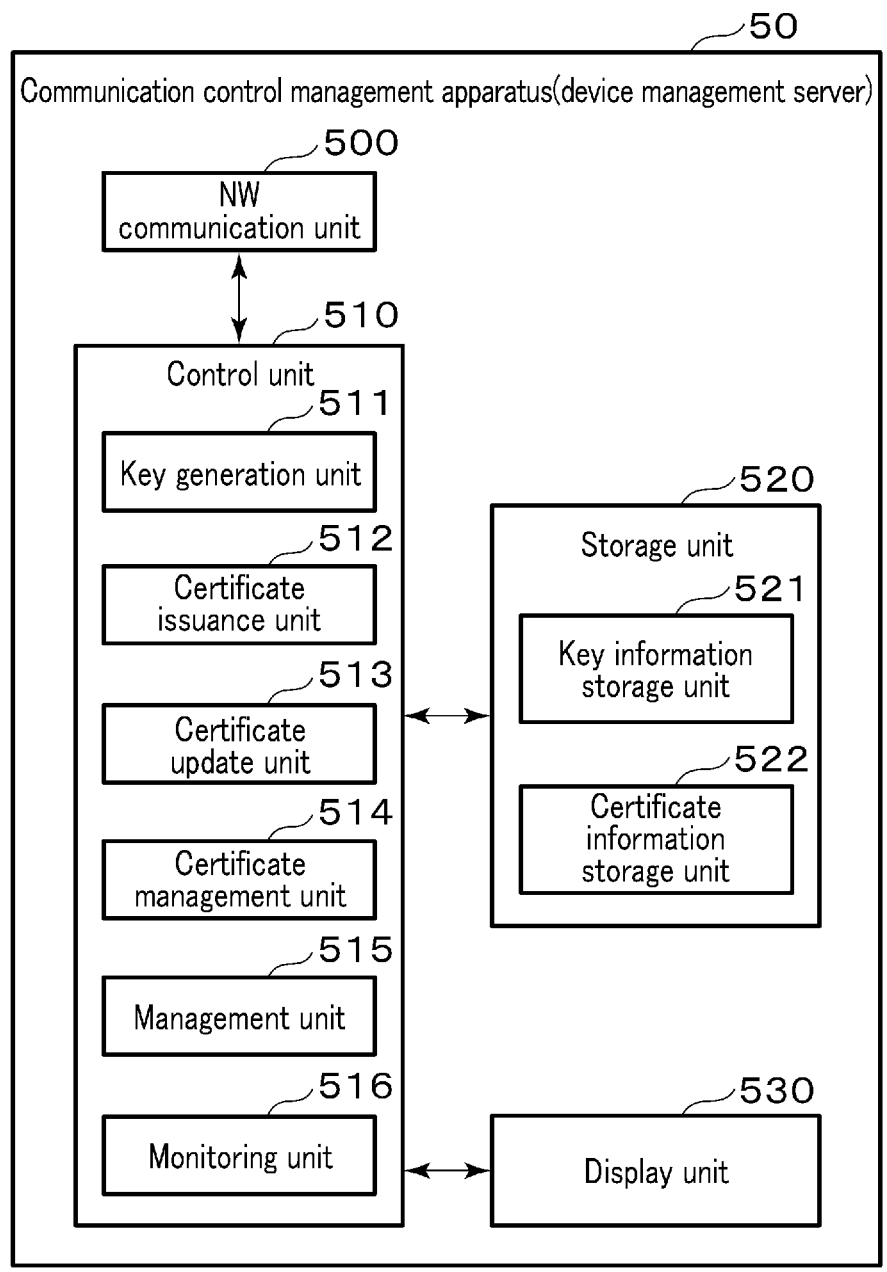
F I G. 6

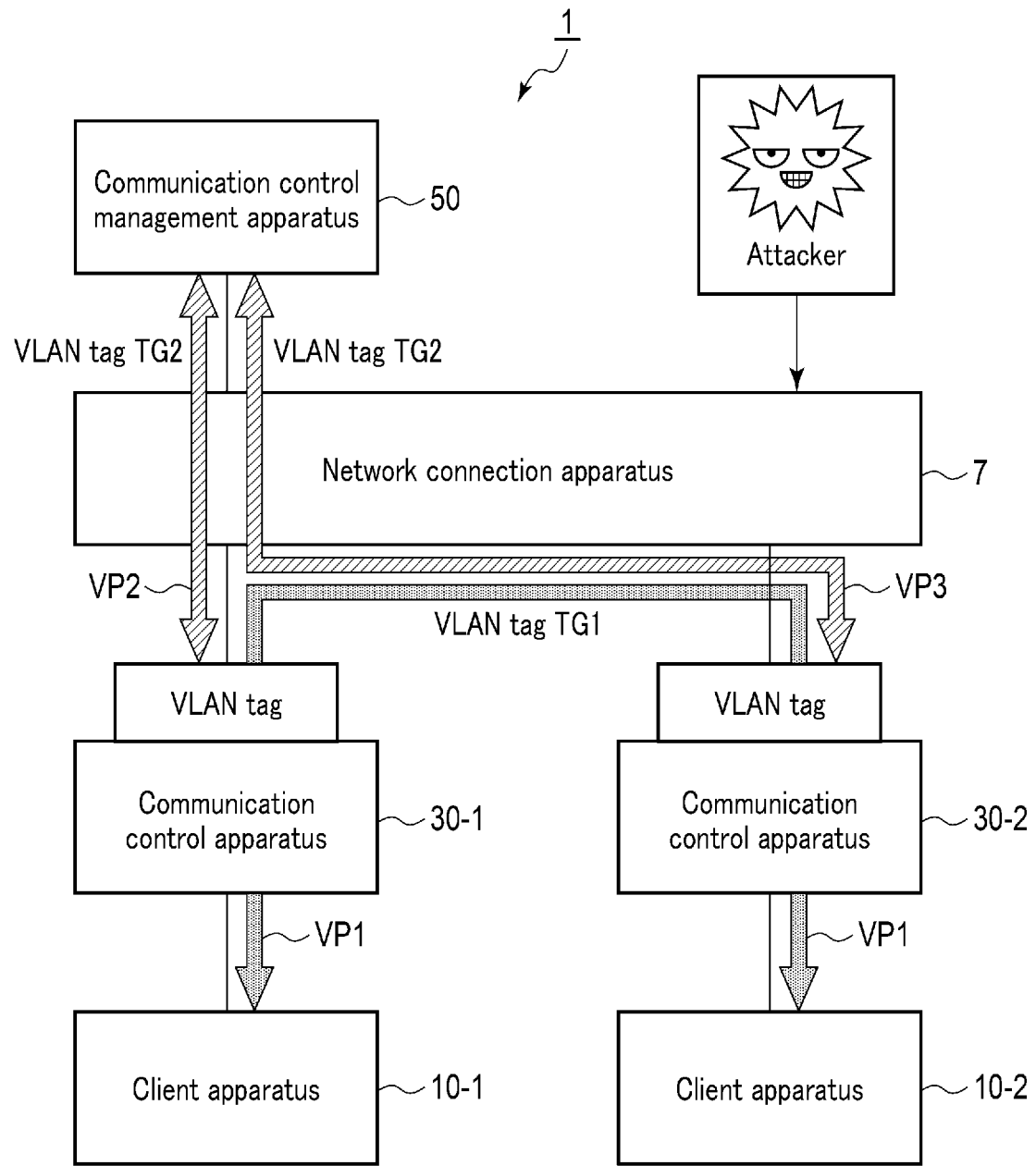
F I G. 8

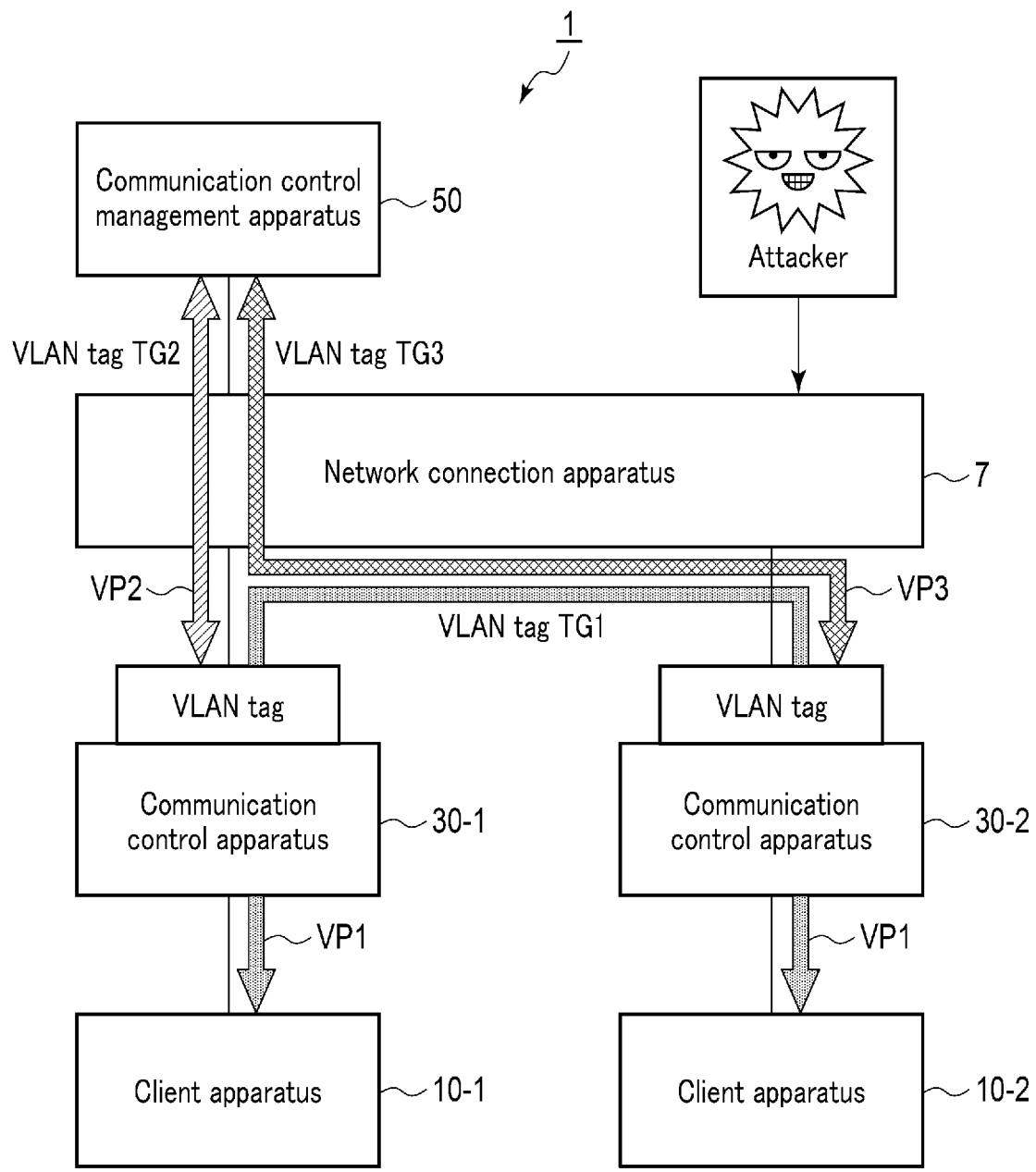
F I G. 10

COMMUNICATION SYSTEM AND COMPUTER-READABLE STORAGE MEDIUM

CROSS REFERENCE TO RELATED APPLICATIONS

This application is a Continuation application of PCT Application No. PCT/JP2022/009983, filed Mar. 8, 2022 and based upon and claiming the benefit of priority from Japanese Patent Application No. 2021-046360, filed Mar. 19, 2021, the entire contents of all of which are incorporated herein by reference.

FIELD

Embodiments of the present invention relate to a communication system and a computer-readable storage medium.

BACKGROUND

With the development of Internet of Things (IoT) technology, various things in the world such as home electric appliances, automobiles, and factories have come to be connected to the Internet. There is an increasing movement in which various types of operation data during operation and inspection are collected in factories, power plants, railways, and the like utilizing such IoT technology, and analysis is performed by artificial intelligence (AI), which leads to preventive maintenance in which signs of failure are detected in advance and efficient operation of facilities. In any case, in order to collect sensor information via a network and utilize the data, there is a need to connect one that has been once operated only by a closed unique network to an open network. In a case where a system that has been protected by a unique network is connected to an open network, the system may be accessed without authorization via the open network.

BRIEF DESCRIPTION OF THE DRAWINGS

FIG. 3 is a block diagram illustrating a functional configuration example in a client-side communication control apparatus and a server-side communication control apparatus according to each embodiment.

FIG. 4 is a diagram illustrating a hardware configuration example of an IC card as a configuration example of an authentication unit in a communication control apparatus according to each embodiment.

FIG. 5 is a block diagram illustrating a functional configuration example in the C card as a configuration example of the authentication unit in the communication control apparatus according to each embodiment.

FIG. 6 is a block diagram illustrating a functional configuration example in a communication control management apparatus according to each embodiment.

FIG. 8 is a diagram illustrating a configuration example of a communication system according to a first embodiment.

FIG. 10 is a diagram illustrating a configuration example of a communication system according to a second embodiment.

DETAILED DESCRIPTION

According to an embodiment, a communication system includes a first communication control apparatus connected between a network connection apparatus and a first client apparatus, a second communication control apparatus connected between the network connection apparatus and a second client apparatus, and a communication control management apparatus that is connected to the network connection apparatus and manages communication by the first communication control apparatus and second communication control apparatus. The communication control management apparatus monitors communication based on management information defining regular communication between the first client apparatus and the second client apparatus as communication by the first packet including the first virtual tag, and defining regular communication between the communication control management apparatus and the first communication control apparatus or second communication control apparatus as communication by the second packet including the second virtual tag.

Hereinafter, each embodiment will be described with reference to the drawings.

First, a basic configuration example and an operation example of a communication system according to each embodiment will be described.

Figure 1:
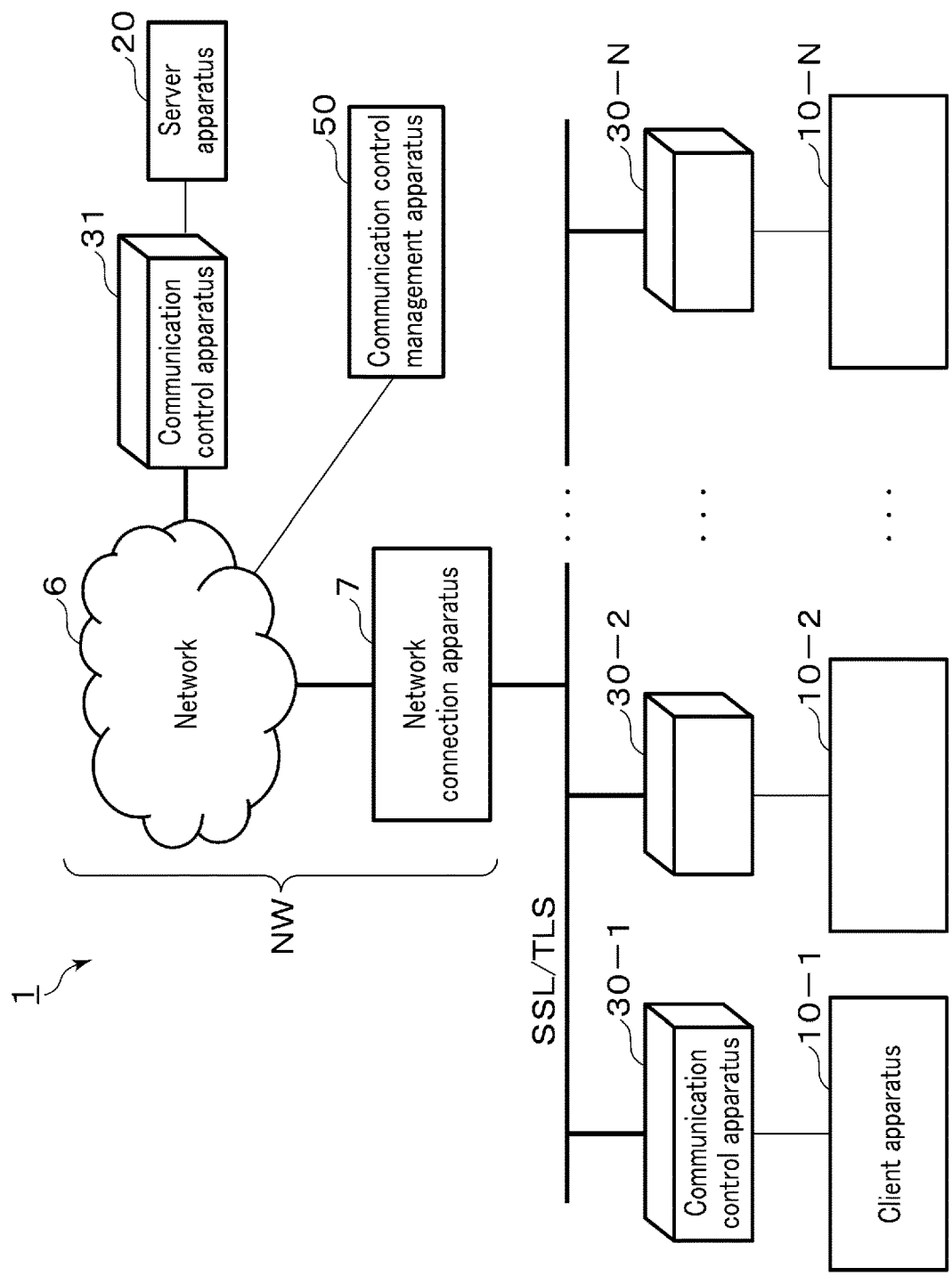
FIG. 1 is a diagram illustrating a basic configuration example of a communication system according to each embodiment.

FIG. 1 is a diagram illustrating a configuration example of a communication system 1 including a configuration serving as a base of a communication system according to each embodiment.

The communication system 1 includes client apparatuses 10 (10-1 to 10-N) (N: natural number), a server apparatus 20, client-side communication control apparatuses (30-1 to 30-N) (N: natural number) (examples of "first communication control apparatus"), a server-side communication control apparatus 31 (example of "first communication control apparatus"), a communication control management apparatus 50 (example of "private certificate authority"), a network 6, and a network connection apparatus 7 (gateway or the like). In the following description, the network 6 and the network connection apparatus 7 that connects the network 6 and the client apparatuses 10 and the like are also collectively referred to as a "network NW".

The client apparatuses 10 are connected to the network NW via the client-side communication control apparatuses 30. The server apparatus 20 is connected to the network NW via the server-side communication control apparatus 31. Note that details of the configurations of the client apparatuses 10 and the server apparatus 20 will be described below.

The client-side communication control apparatuses 30 are connected between the client apparatuses 10 and the network NW, and mediate communication between the client apparatuses 10 and the server apparatus 20. The client-side communication control apparatuses 30 acquire data transmitted from the client apparatuses 10 to the server apparatus

20, and output the acquired data to the server apparatus 20. Here, in transmitting data to the server apparatus 20, the client-side communication control apparatuses 30 encrypt the data acquired from the client apparatuses 10, and transmit the encrypted data to the server apparatus 20.

The client-side communication control apparatuses 30 also acquire data transmitted from the server apparatus 20 to the client apparatuses 10, and output the acquired data to the client apparatuses 10. Here, the data acquired by the client-side communication control apparatuses 30 is encrypted data. In outputting data to the client apparatuses 10, the client-side communication control apparatuses 30 decrypt data acquired from the server apparatus 20 via the server-side communication control apparatus 31, and output the decrypted data to the client apparatuses 10.

The server-side communication control apparatus 31 is connected between the server apparatus 20 and the network NW, and mediates communication between the client apparatuses 10 and the server apparatus 20. The server-side communication control apparatus 31 acquires data transmitted from the server apparatus 20 to the client apparatuses 10, and transmits the acquired data to the client apparatuses 10. Here, in transmitting data to the client apparatuses 10, the server-side communication control apparatus 31 encrypts the data acquired from the server apparatus 20 and transmits the encrypted data to the client apparatuses 10.

The server-side communication control apparatus 31 also acquires data transmitted from the client apparatuses 10 to the server apparatus 20, and outputs the acquired data to the server apparatus 20. Here, the data acquired by the server-side communication control apparatus 31 is encrypted data. In outputting data to the server apparatus 20, the server-side communication control apparatus 31 decrypts data acquired from the client apparatuses 10 via the client-side communication control apparatuses 30, and outputs the decrypted data to the server apparatus 20.

In data encryption performed by the client-side communication control apparatuses 30 and the server-side communication control apparatus 31, encryption by, for example, a protocol of secure socket layer (SSL)/trans port layer security (TLS) is performed. The client-side communication control apparatuses 30 and the server-side communication control apparatus 31, for example, combine the SSL/TLS protocol with an HTTP, encrypt data included in the HTTP, and replace data with an HTTP secure (HTTPS) having improved security.

Note that the data encryption performed by the client-side communication control apparatuses 30 and the server-side communication control apparatus 31 is not limited to replacing an HTTP with an HTTPS. The client-side communication control apparatuses 30 and the server-side communication control apparatus 31 may combine the SSL/TLS protocol with a communication protocol of various types and replace the communication protocol with a secure communication protocol having improved security. For example, the client-side communication control apparatuses 30 and the server-side communication control apparatus 31 may replace a file transfer protocol (FTP) with an FTP secure (FTPS).

In the communication system 1, data encrypted by the client-side communication control apparatuses 30 or the server-side communication control apparatus 31 is output to the network NW. In other words, data flowing through the network NW in the communication system 1 is encrypted data, and thus, a risk that data transmitted and received through the network NW is accessed with maliciousness from the outside and the data is intercepted is avoided, and security is improved. Note that the data interception referred to herein refers to an "act of sneaking a look at data" or an "act of extracting data".

The communication control management apparatus 50 is a communication management server that is connected to the network connection apparatus 7 or connected to the network connection apparatus 7 via the network 6 and manages communication using the client-side communication control apparatuses and the server-side communication control apparatus. For example, the communication control management apparatus 50 issues client certificates and secret keys to the client-side communication control apparatuses 30. In the configuration example illustrated in FIG. 1, the communication control management apparatus 50 issues client certificates and secret keys stored in IC cards attached to the client-side communication control apparatuses 30. The communication control management apparatus 50 also transmits the client certificates and the secret keys that the IC cards are caused to store to the client-side communication control apparatuses 30 to which the IC cards are attached via the network NW.

The communication control management apparatus 50 also issues a server certificate and a secret key to the server-side communication control apparatus 31. For example, the communication control management apparatus 50 issues a server certificate and a secret key stored in an IC card. The communication control management apparatus 50 also transmits the server certificate and the secret key that the IC card is caused to store to the server-side communication control apparatus 31 to which the IC card is attached via the network NW. Each of the client certificates, the server certificate, and the secret keys is information necessary for determining a common key (session key) used in a case where the client-side communication control apparatuses 30 and the server-side communication control apparatus 31 perform encrypted communication.

Here, the configurations of the client apparatuses and the server apparatus 20 will be described. The client apparatuses 10 and the server apparatus 20 are, for example, constituents (components) that construct a social infrastructure system. The social infrastructure is equipment necessary for establishing a social foundation such as a road transportation network, a power generation facility, a power delivery facility, a water treatment facility, or a gas distribution facility. The social infrastructure system is, for example, a mechanism for stably operating the social infrastructure by monitoring the social infrastructure, grasping a change in the status, and responding to the change. Hereinafter, a case where the client apparatuses 10 and the server apparatus are components of a monitoring system that monitors roads, public facilities, and the like will be described as an example. In this case, the client apparatuses 10 are apparatuses (network monitoring cameras) that transmit image data obtained by imaging a status of a road or the like via the network NW. The server apparatus 20 is an apparatus that receives the image data transmitted by the client apparatuses 10 via the network NW.

Note that the client apparatuses 10 and the server apparatus 20 are not limited to the components of the monitoring system. For example, the client apparatuses 10 and the server apparatus may be components of a system that monitors a power status in a power generation facility or a power delivery facility, or may be components of a system that acquires a delivery status in a distribution center, a system that acquires an operating status of a facility in a factory or a research institution, or the like.

Figure 2:
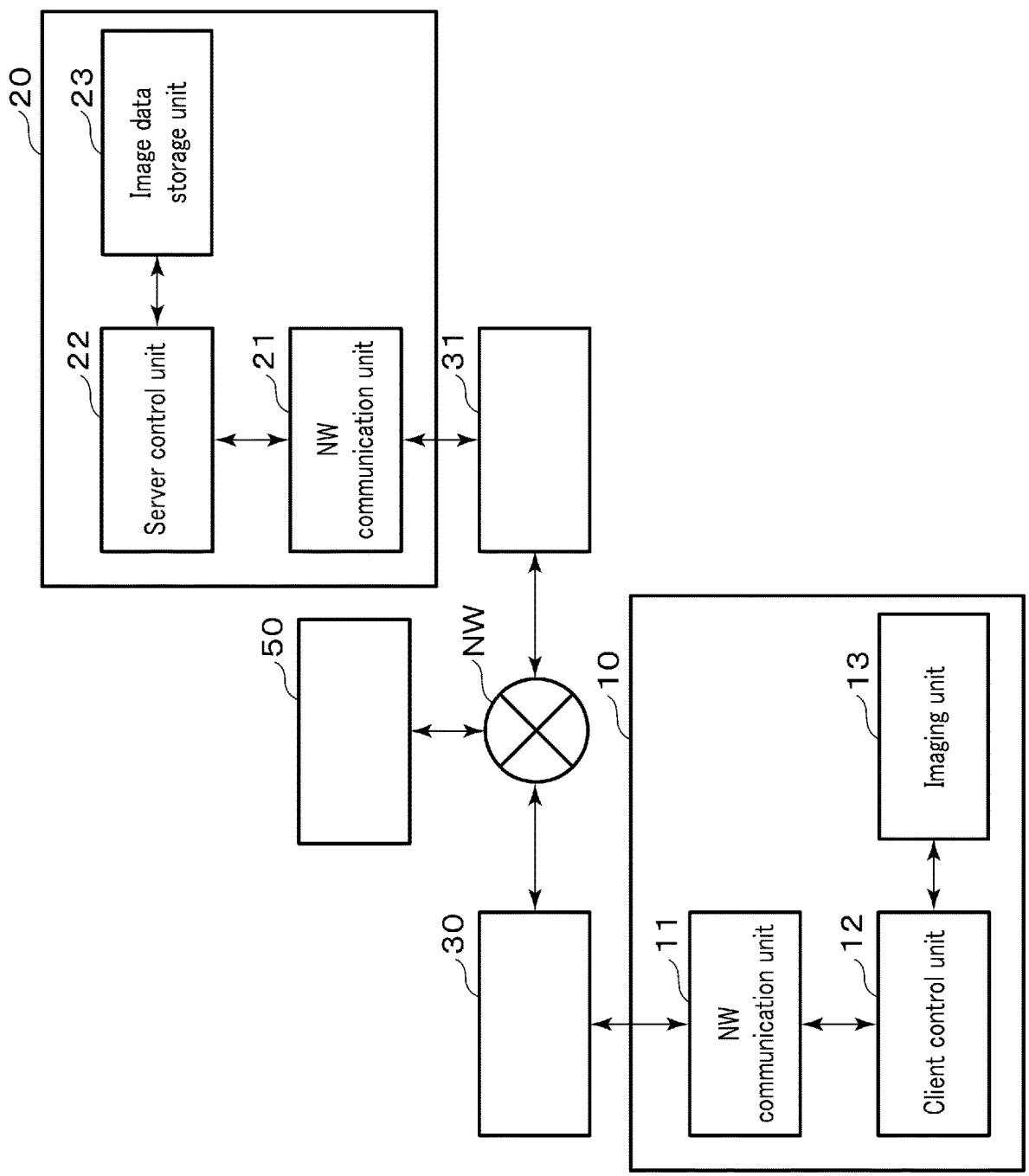
FIG. 2 is a block diagram illustrating a functional configuration example of a client apparatus and a server apparatus according to each embodiment.

FIG. 2 is a block diagram illustrating a functional configuration example of a client apparatus 10 and the server apparatus 20 illustrated in FIG. 1.

The client apparatus 10 includes a network (NW) communication unit 11, a client control unit 12, and an imaging unit 13. The NW communication unit 11 is, for example, a port of Ethernet (registered trademark) of the client apparatus 10. The NW communication unit 11 is connected to a client-side communication control apparatus 30, and outputs data transmitted from the client apparatus 10 to the server apparatus 20 to the client-side communication control apparatus 30. Note that, in a conventional system, the NW communication unit 11 corresponds to a functional unit that is connected to the network NW and communicates with the server apparatus 20 via the network NW.

The client control unit 12 is, for example, a processor including a central processing unit (CPU) and the like, and comprehensively controls the client apparatus 10. For example, under the control of the server apparatus 20, the client control unit 12 causes the imaging unit 13 to start or stop imaging, and sets an imaging condition such as a direction of a camera for imaging or a magnification for imaging to the imaging unit 13.

The imaging unit 13 performs imaging of a landscape at a predetermined location in accordance with an instruction from the client control unit 12. The imaging unit 13 outputs data obtained by imaging (image data) to the client control unit 12.

The server apparatus 20 includes a network (NW) communication unit 21, a server control unit 22, and an image data storage unit 23. The NW communication unit 21 is, for example, a port of Ethernet (registered trademark) of the server apparatus 20. The NW communication unit 21 is connected to the server-side communication control apparatus 31, and outputs data transmitted from the server apparatus 20 to the client apparatus 10 to the server-side communication control apparatus 31. Note that, in a conventional system, the NW communication unit 21 corresponds to a functional unit that is connected to the network NW and communicates with the client apparatus 10 via the network NW.

The server control unit 22 is, for example, a processor including a CPU and the like, and comprehensively controls the server apparatus 20. For example, the server control unit 22 causes the image data storage unit 23 to store image data obtained by imaging by the client apparatus 10. The image data storage unit 23 stores image data in accordance with an instruction of the server control unit 22.

In a case where the client apparatus 10 and the server apparatus 20 are connected to each other via NW communication units thereof and the network NW, an HTTP that is a general communication protocol in a network monitoring camera may be used for communication between the client apparatus and the server apparatus 20.

In this case, unencrypted information (so-called plaintext) output to the network NW by the client apparatus 10 or the server apparatus 20 flows through the network NW. In this case, there is a risk that image data is easily intercepted or tampered in a case where data on the network NW is acquired from the outside with maliciousness. As a countermeasure against such an unauthorized attack, it is conceivable that the client apparatus 10 is caused to encrypt image data and output the encrypted image data to the network NW. For example, the client control unit 12 of the client apparatus 10 encrypts image data and outputs the encrypted image data to the network NW.

However, since a processor such as a CPU included in a monitoring camera is generally used for use used for being used for use in compression and encoding of image data, the processor often does not further include a resource (resource) for only performing processing for encryption. In such a case, the CPU originally included in the client control unit 12 cannot encrypt image data. In a case where the client control unit 12 is caused to encrypt image data, it is conceivable that the hardware configuration of the client control unit 12 needs to be changed or replaced, for example, a processor for encrypting image data is further included in the client control unit 12. Since the client apparatus 10 is a component included in a social infrastructure such as a monitoring camera, it is not easy to change or replace the hardware configuration. In view of such circumstances, it is desirable that image data is encrypted and output to the network NW without the client apparatus 10 being changed.

In the communication system 1, the client-side communication control apparatus 30 connected between the client apparatus 10 and the network NW encrypts data transmitted by the client apparatus 10 and outputs the data to the network NW. Furthermore, the server-side communication control apparatus 31 connected between the server apparatus 20 and the network NW encrypts control data transmitted by the server apparatus 20 and outputs the control data to the network NW. As a result, the security of image data flowing through the network NW is improved without the client apparatus 10 and the server apparatus 20 being changed.

Here, the configurations of a client-side communication control apparatus 30 and the server-side communication control apparatus 31 will be described with reference to FIG. 3. FIG. 3 is a block diagram illustrating a functional configuration example in the client-side communication control apparatus 30 and the server-side communication control apparatus 31 illustrated in FIG. 1. The functional configurations of the client-side communication control apparatus 30 and the server-side communication control apparatus 31 are the same. Therefore, hereinafter, one (for example, client-side communication control apparatus 30) configuration will be described, and the description of the other (for example, server-side communication control apparatus 31) configuration will be omitted. Furthermore, hereinafter, in a case where the client-side communication control apparatus 30 and the server-side communication control apparatus 31 are not distinguished from each other, they are simply referred to as a communication control apparatus 30 (31) or the like.

As illustrated in FIG. 3, the communication control apparatus 30 (31) includes a network (NW) communication unit 32, a control unit 33, an apparatus communication unit 34, a reader/writer 35, a storage unit 36, and an IC card 40.

Here, the IC card 40 is an example of an "authentication unit". The authentication unit is not limited to that implemented by the reader/writer 35 and the IC card 40. The authentication unit may be implemented by the control unit 33 or may be implemented by a processing circuit for authentication processing.

The NW communication unit 32 is connected to the network NW and communicates with the other communication control apparatus 30 (31) via the network NW.

The control unit 33 is, for example, a processor including a CPU and the like, and comprehensively controls the communication control apparatus 30 (31). For example, the control unit 33 transmits a command to the IC card 40 via the reader/writer 35 and receives a response from the IC card 40. Furthermore, the control unit 33 transmits information based on a response received from the IC card 40 to the other communication control apparatus 30 (31) via the NW communication unit 32. Furthermore, the control unit 33 transmits a command to the IC card 40 based on information received from the other communication control apparatus 30 (31) via the NW communication unit 32.

The apparatus communication unit 34 is connected to an apparatus (client apparatus 10 or server apparatus 20) and communicates with the apparatus. Specifically, the apparatus communication unit 34 of the client-side communication control apparatus 30 is connected to the client apparatus 10, acquires image data from the client apparatus 10, and outputs decrypted control data to the client apparatus 10. Furthermore, the apparatus communication unit 34 of the server-side communication control apparatus 31 is connected to the server apparatus 20, acquires control data from the server apparatus 20, and outputs decrypted image data to the server apparatus 20.

The reader/writer 35 is connected to the IC card 40 via a contact unit 36 and communicates with the IC card 40.

The IC card 40 is formed, for example, by an IC module 41 being implemented in a plastic card base material. That is, the IC card 40 includes the IC module 41 and the card base material in which the IC module 41 is embedded. Furthermore, the IC card 40 is detachably attached to the communication control apparatus 30 (31), and can communicate with the communication control apparatus 30 (31) via the contact unit 36.

The storage unit 36 is a memory as a non-transitory computer-readable storage medium, and stores an operation program and the like of the control unit 33. The control unit 33 operates based on the operation program and implements each function. For example, the control unit 33 operates based on the operation program, reports the communication status to the communication control management apparatus 50, and controls the operation based on a control command from the communication control management apparatus 50.

Furthermore, the storage unit 36 stores a transmission destination list (communication permission list). The transmission destination list includes information for identifying a communication partner for which communication is permitted. For example, the information for identifying a communication partner is a uniform resource locator (URL). In the present embodiment, the transmission destination list stored in the storage unit 36 includes identification information for identifying the client apparatuses 10 (10-1 to 10-N).

For example, the IC card 40 receives a command (processing request) transmitted by the communication control apparatus 30 (31) via the contact unit 36, and executes processing (command processing) according to the received command. Then, the IC card 40 transmits a response (processing response) that is an execution result of the command processing to the communication control apparatus 30 (31) via the contact unit 36.

The IC module 41 includes the contact unit 36 and an IC chip 42. The contact unit 36 includes terminals of various signals necessary for the operation of the IC card 40. Here, the terminals of various signals include a terminal that receives supply of a power supply voltage, a clock signal, a reset signal, and the like from the communication control apparatus 30 (31), and a serial data input/output terminal (SIO terminal) for communicating with the communication control apparatus 30 (31). The IC chip 42 is, for example, a large scale integration (LSI) such as a 1-chip microprocessor.

Here, the hardware configuration of the IC card 40 will be described with reference to FIG. 4. FIG. 4 is a diagram illustrating a hardware configuration example of the IC card 40 illustrated in FIG. 3.

The IC card 40 includes the IC module 41 including the contact unit 36 and the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM) (registered trademark) 47. Furthermore, the configurations (43 to 47) are connected via an internal bus BS.

The UART 43 performs serial data communication with the communication control apparatus 30 (31) via the SIO terminal. The UART 43 outputs data (for example, 1-byte data) obtained by performing parallel conversion on a serial data signal received via the SIO terminal to the internal bus BS. Furthermore, the UART 43 performs serial conversion on data acquired via the internal bus BS, and outputs the converted data to the communication control apparatus 30 (31) via the SIO terminal. The UART 43 receives a command from the communication control apparatus 30 (31) via the SIO terminal, for example. Furthermore, the UART 43 transmits a response to the communication control apparatus 30 (31) via the SIO terminal.

The CPU 44 executes a program stored in the ROM 45 or the EEPROM 47 and performs various types of processing of the IC card 40. For example, the CPU 44 executes command processing according to a command received by the UART 43 via the contact unit 36.

The ROM 45 is, for example, a non-volatile memory such as a mask ROM, and stores a program for executing various types of processing of the IC card 40 and data such as a command table. The RAM 46 is, for example, a volatile memory such as a static RAM (SRAM), and temporarily stores data used in a case where various types of processing of the IC card 40 is performed. The EEPROM 47 is, for example, an electrically rewritable non-volatile memory and is a non-transitory computer-readable storage medium. The EEPROM 47 stores various types of data used by the IC card 40. The EEPROM 47 stores, for example, information used for various services (applications) using the IC card 40.

Next, the configuration of the IC card 40 will be described with reference to FIG. 5. FIG. 5 is a block diagram illustrating a functional configuration example of the IC card 40 illustrated in FIG. 4. The IC card 40 includes a communication unit 400, a control unit 401, and a storage unit 404. Here, each unit of the IC card 40 illustrated in FIG. 5 is implemented by using hardware of the IC card 40 illustrated in FIG. 4.

The communication unit 400 is implemented by, for example, the UART 43, the CPU 44, and a program stored in the ROM 45, and transmits and receives a command and a response to and from, for example, the communication control apparatus 30 (31) via the contact unit 36. That is, the communication unit 400 receives a command (processing request) for requesting predetermined processing from the communication control apparatus 30 (31), and transmits a response (processing response) to the command to the communication control apparatus 30 (31). The communication unit 400 causes the RAM 46 to store received data received from the communication control apparatus 30 (31) via the UART 43. Furthermore, the communication unit 400 transmits transmission data stored in the RAM 46 to the communication control apparatus 30 (31) via the UART 43.

The control unit 401 is implemented by, for example, the CPU 44, the RAM 45, and the ROM 46 or the EEPROM 47, and comprehensively controls the IC card 40. The control unit 401 includes a command processing unit 402 and an encryption/decryption unit 403.

Here, processing performed by the command processing unit 402 is an example of "authentication processing". Furthermore, processing performed by the encryption/decryption unit 403 is an example of "encryption/decryption processing".

The command processing unit 402 executes various types of command processing. For example, the command processing unit 402 performs SSL/TLS handshake as command processing for requesting an HTTPS request to be described below. In the SSL/TLS handshake, key information and the like necessary for encrypted communication are exchanged, and mutual authentication with a communication destination apparatus is performed. Here, the mutual authentication is authentication processing of mutually checking that the client-side communication control apparatus 30 and the server-side communication control apparatus 31 are apparatuses that were duly authenticated before performing communication.

The encryption/decryption unit 403 executes processing of encrypting data and processing of decrypting encrypted data. The encryption/decryption unit 403 encrypts data output from an apparatus (client apparatus 10 or server apparatus 20) and acquired via the communication unit 400. Furthermore, the encryption/decryption unit 403 decrypts encrypted data from the network NW acquired via the communication unit 400.

The storage unit 404 is, for example, a storage unit configured by the EEPROM 47, and includes a certificate information storage unit 405 and a secret information storage unit 406. The certificate information storage unit 405 stores a certificate for an apparatus (client apparatus 10 or server apparatus 20) issued by the communication control management apparatus 50. Specifically, information indicating a client certificate is stored in the certificate information storage unit 405 of the IC card 40 attached to the client-side communication control apparatus 30. Furthermore, information indicating a server certificate is stored in the certificate information storage unit 405 of the IC card 40 attached to the server-side communication control apparatus 31.

The secret information storage unit 406 stores a secret key for an apparatus (client apparatus 10 or server apparatus 20) issued by the communication control management apparatus 50. Specifically, information indicating a secret key issued to the client-side communication control apparatus 30 is stored in the secret information storage unit 406 of the IC card 40 attached to the client-side communication control apparatus 30. Furthermore, information indicating a secret key issued to the server-side communication control apparatus 31 is stored in the certificate information storage unit 405 of the IC card 40 attached to the server-side communication control apparatus 31.

Here, the configuration of the communication control management apparatus 50 will be described with reference to FIG. 6. FIG. 6 is a block diagram illustrating a configuration example of the communication control management apparatus 50 illustrated in FIG. 1. The communication control management apparatus 50 includes, for example, a network (NW) communication unit 500, a control unit 510, a storage unit 520, and a display unit 530.

The NW communication unit 500 is connected to the network NW and communicates with a communication control apparatus 30 (31) via the network NW.

The control unit 510 includes, for example, a processor such as a CPU. The control unit 510 implements various types of processing by the processor executing a program. The control unit 510 comprehensively controls the communication control management apparatus 50. Furthermore, the control unit 510 mainly operates as a private certificate authority that recognizes the validity of a communication control apparatus 30 (31). In the example illustrated in FIG. 6, the control unit 510 executes processing for implementing functions as a key generation unit 511, a certificate issuance unit 512, a certificate update unit 513, a certificate management unit 514, a management unit 515, and a monitoring unit 516 by the processor executing a program.

The key generation unit 511 issues a secret key corresponding to a public key included in a certificate to be described below based on, for example, an authentication application from a communication control apparatus 30 (31).

The certificate issuance unit 512 issues a certificate that recognizes the validity of a communication control apparatus 30 (31) based on, for example, an authentication application from the communication control apparatus 30 (31). The certificate includes a public key and information indicating an owner of the communication control apparatus 30 (31).

The certificate update unit 513 updates a certificate by setting a new expiration date for a certificate having an expiration date that passed. For example, the certificate update unit 513 issues a certificate obtained by extending an expiration date of a certificate issued to a communication control apparatus 30 (31) based on an update application from the communication control apparatus 30 (31), and transmits the issued certificate to the communication control apparatus 30 (31). The expiration date of the certificate of the communication control apparatus 30 (31) is extended by information indicating the issued certificate being received by the communication control apparatus 30 (31) and stored in the certificate information storage unit 405 of the IC card 40 of the communication control apparatus 30 (31).

The certificate management unit 514 manages an already issued certificate. The certificate management unit 514 performs processing of invalidating a certificate issued to a communication control apparatus 30 (31) in a case where mutual authentication does not prove mutual validity due to, for example, tampering, theft, or the like of the IC card 40 attached to the communication control apparatus 30 (31). Furthermore, the certificate management unit 514 may make a response indicating whether certificates issued to a communication control apparatus 30 (31) and other communication apparatuses were issued by the certificate management unit 514 based on an inquiry from the communication control apparatus 30 (31). Furthermore, the certificate management unit 514 may periodically check whether an issued certificate is used by a valid communication control apparatus 30 (31).

The management unit 515 manages the communication control apparatuses 30 (31). For example, the management unit 515 remotely controls mutual authentication performed by the communication control apparatuses 30 (31) via the network NW. The monitoring unit 516 monitors communication between the client apparatuses 10 (10-1 to 10-N) based on management information defining regular communication between the client apparatuses 10 as communication by a packet PA1 including a VLAN tag TG1. Furthermore, the monitoring unit 516 monitors communication between the communication control management apparatus 50 and the communication control apparatuses 30 (30-1 to 30-N) based on management information defining regular communication between the communication control management apparatus 50 and the communication control apparatuses 30 as communication by a packet PA2 including a VLAN tag TG2. Alternatively, the monitoring unit 516 monitors communication between the communication control management apparatus 50 and the communication control apparatus 30-1 based on management information defining regular communication between the communication control management apparatus 50 and the communication control apparatus 30-1 as communication by the packet PA2 including the VLAN tag TG2, and monitors communication between the communication control management apparatus 50 and the communication control apparatus 30-2 based on management information defining regular communication between the communication control management apparatus 50 and the communication control apparatus 30-2 as communication by a packet PA3 including a VLAN tag TG3.

The storage unit 520 is a memory as a non-transitory computer-readable storage medium, and stores an operation program and the like of the control unit 510. The control unit 510 operates based on the operation program and implements each function. For example, the control unit 510 operates based on the operation program, and controls the communication control apparatuses 30 by transmitting a control command to the communication control apparatuses 30. Furthermore, the control unit 510 operates based on the operation program and transmits alert information to the communication control apparatuses 30.

Furthermore, the storage unit 520 stores a transmission destination list (communication permission list). The transmission destination list includes information for identifying a communication partner for which communication is permitted. For example, the information for identifying a communication partner is a uniform resource locator (URL). In the present embodiment, the transmission destination list stored in the storage unit 520 includes identification information for identifying the client apparatuses 10 (10-1 to 10-N).

Furthermore, the storage unit 520 includes, for example, a key information storage unit 521 and a certificate information storage unit 522. The key information storage unit 521 stores, for example, an already issued public key and information indicating a secret key. The certificate information storage unit 522 stores, for example, information indicating an already issued certificate. The key information storage unit 521 and the certificate information storage unit 522 are referred to, for example, in a case where the key generation unit 511 issues a secret key or in a case where the certificate issuance unit 512 issues a certificate. Furthermore, the key information storage unit 521 stores information indicating a secret key issued by the key generation unit 511. Furthermore, the certificate information storage unit 522 stores information indicating a certificate issued by the certificate issuance unit 512.

The display unit 530 displays information regarding an attacked communication path. For example, in a case where a communication path VP1 is identified as being attacked, the display unit 530 displays the fact that the communication path VP1 is attacked, there is an abnormality occurring in the communication path VP1, and communication of the communication path VP1 is interrupted.

Here, a flow of processing performed by the communication system 1 will be described with reference to FIG. 7.

Figure 7:
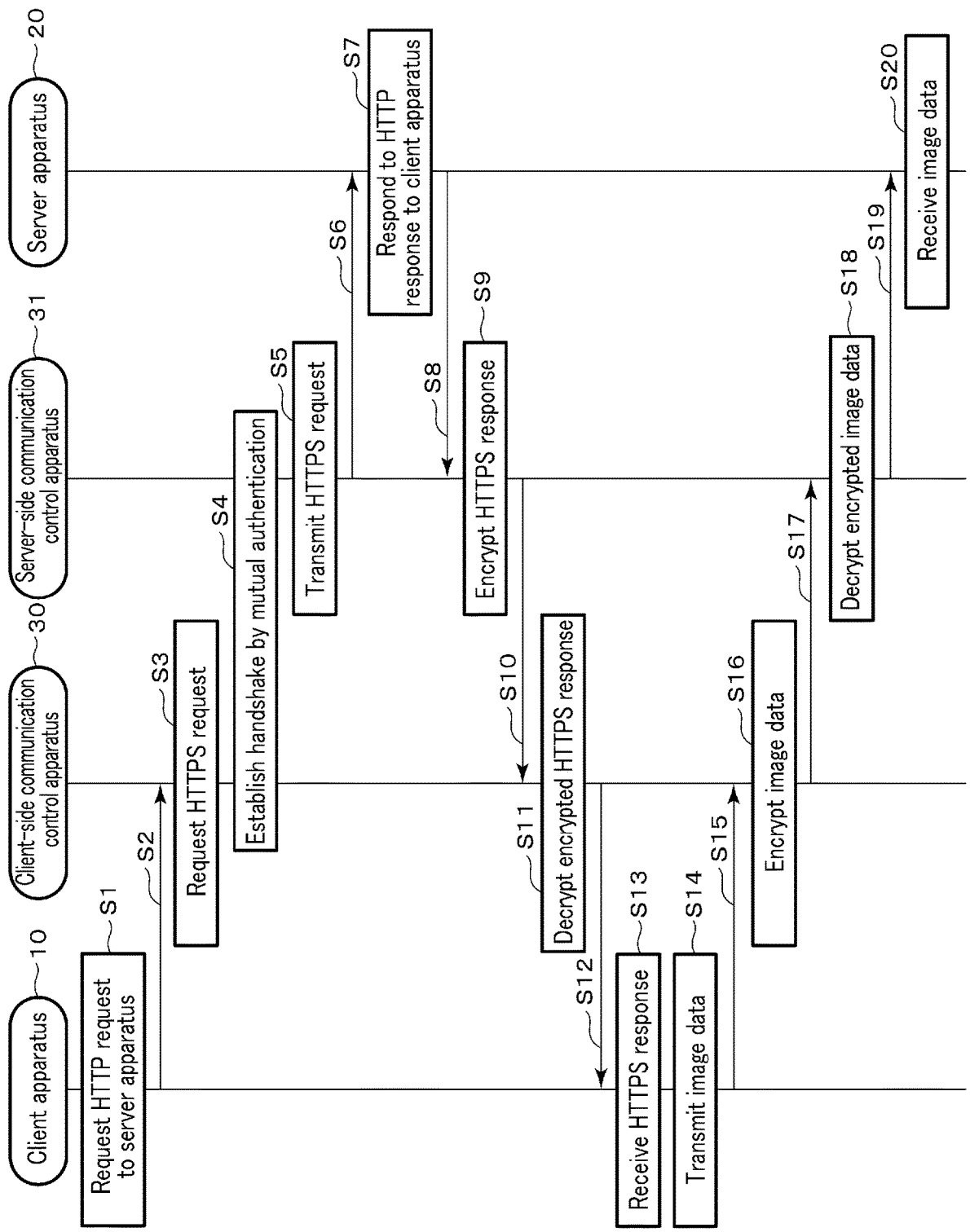
FIG. 7 is a sequence illustrating an example of processing performed by the communication system illustrated in FIG. 1.

FIG. 7 is a sequence chart illustrating an example of processing performed by the communication system 1.

In the case of transmitting image data to the server apparatus 20, a client apparatus 10 first transmits an HTTP request to the server apparatus 20 (step S1). The HTTP request transmitted by the client apparatus 10 is acquired by a client-side communication control apparatus 30 (step S2).

Upon acquiring the HTTP request transmitted by the client apparatus 10, the client-side communication control apparatus 30 transmits an HTTPS request (ClientHello) to the server-side communication control apparatus 31 (step S3). As a result, handshake between the client-side communication control apparatus 30 and the server-side communication control apparatus 31 is started (step S4).

Specifically, the ClientHello transmitted by the client-side communication control apparatus 30 includes, for example, a version of TLS and information indicating a list of encryption schemes and algorithms used for communication. The server-side communication control apparatus 31 transmits an HTTPS response (ServerHello) to the client-side communication control apparatus 30 as a response to the ClientHello. The ServerHello transmitted by the server-side communication control apparatus 31 includes, for example, information selected by the server apparatus 20 from among options presented by the ClientHello. In other words, a specific encryption algorithm in communication is determined by the server-side communication control apparatus 31 performing selection on the presentation from the client-side communication control apparatus 30.

Then, the server-side communication control apparatus 31 transmits information necessary for a common key used for encrypted communication. The information necessary for the common key includes, for example, information indicating a public key and a certificate thereof issued to the server apparatus 20, and information requesting transmission of a public key of the client apparatus 10 and a certificate thereof. The client-side communication control apparatus 30 transmits, to the server-side communication control apparatus 31, a public key and a certificate thereof issued to the own apparatus, and information necessary for a common key used for encrypted communication.

Mutual authentication between the client-side communication control apparatus 30 and the server-side communication control apparatus 31 is performed as follows, for example. The client-side communication control apparatus 30 generates a signature from the ServerHello or the like received so far, and transmits the signature to the server-side communication control apparatus 31. The server-side communication control apparatus 31 verifies the signature received from the client-side communication control apparatus 30 based on the certificate received from the client-side communication control apparatus 30. In a case where the verification is successful, the server-side communication control apparatus 31 determines that the certificate is certainly for the client-side communication control apparatus 30. Furthermore, the server-side communication control apparatus 31 generates a signature from the ClientHello or the like received so far, and transmits the signature to the client-side communication control apparatus 30. The client-side communication control apparatus 30 verifies the signature received from the server-side communication control apparatus 31 based on the certificate received from the server-side communication control apparatus 31. In a case where the verification is successful, the client-side communication control apparatus 30 determines that the certificate is certainly for the server-side communication control apparatus 31.

In a case where mutual authentication between the client-side communication control apparatus 30 and the server-side communication control apparatus 31 is correctly performed, the client-side communication control apparatus 30 and the server-side communication control apparatus 31 each generate and exchange a common key used for encryption.

The server-side communication control apparatus 31 ends the handshake in a case where the public key and a certificate thereof issued to the server apparatus 20 transmitted from the server-side communication control apparatus 31 are certificates allowed for the client-side communication control apparatus 30, and the public key and a certificate thereof transmitted from the client-side communication control apparatus 30 are certificates allowed for the server-side communication control apparatus 31.

In a case where the handshake with the client-side communication control apparatus 30 is established, the server-side communication control apparatus 31 transmits an HTTP request to the server apparatus 20 (step S5). The HTTP request is an HTTP request transmitted from the client apparatus 10 in step S1.

The HTTP request transmitted by the server-side communication control apparatus 31 is received by the server apparatus 20 (step S6). At this time, the server apparatus 20 recognizes that the HTTP request was requested from the client apparatus 10. Therefore, the server apparatus 20 responds to the HTTP response to the client apparatus 10 (step S7). The HTTP response transmitted by the server apparatus 20 is acquired by the server-side communication control apparatus 31 (step S8).

The server-side communication control apparatus 31 encrypts the acquired HTTP response from the server apparatus 20 using the common key determined in the handshake in step S4 (step S9). The HTTP response encrypted by the server-side communication control apparatus 31 is received by the client-side communication control apparatus 30 via the network NW (step S10). The client-side communication control apparatus 30 decrypts the received HTTP response using the common key (step S11). The HTTP response decrypted by the client-side communication control apparatus 30 is acquired by the client apparatus 10 (step S12). The client apparatus 10 receives the decrypted HTTP response (step S13). At this time, the client apparatus 10 recognizes that the HTTP response was responded from the server apparatus 20. Therefore, the client apparatus 10 transmits image data to the server apparatus 20 (step S14).

The image data transmitted by the client apparatus 10 is acquired by the client-side communication control apparatus 30 (step S15). The client-side communication control apparatus 30 encrypts the image data transmitted by the client apparatus 10 using the common key (step S16). The image data encrypted by the client-side communication control apparatus 30 is received by the server-side communication control apparatus 31 via the network NW (step S17).

The server-side communication control apparatus 31 decrypts the received image data using the common key (step S18). The image data decrypted by the server-side communication control apparatus 31 is acquired by the server apparatus 20 (step S19). The server apparatus 20 receives the decrypted image data (step S20). At this time, the server apparatus 20 recognizes that the image data from the client apparatus 10 was received.

Note that, in step S4 of the flowchart, the client-side communication control apparatus 30 does not permit communication with the communication destination in a case where the mutual authentication between the client-side communication control apparatus 30 and the server-side communication control apparatus 31 is not correctly performed. Specifically, the client-side communication control apparatus 30 does not output information transmitted from the communication destination to the client apparatus 10.

This is because there is a possibility that the communication destination is an unauthorized communication apparatus disguised as the server-side communication control apparatus 31 in a case where the mutual authentication is not correctly performed. In this case, for example, the client-side communication control apparatus 30 may transmit a communication record in a case where the mutual authentication is not correctly performed to the communication control management apparatus 50. As a result, the communication control management apparatus 50 can acquire a communication record in a case where the mutual authentication is not correctly performed, and can monitor an abnormality of the network by grasping a pattern and frequency of unauthorized communication with the client-side communication control apparatus 30 under management.

Furthermore, the client-side communication control apparatus 30 may determine whether to permit communication with the communication destination based on a transmission destination list indicating information regarding a communication device for which communication with the client apparatus 10 is permitted instead of the mutual authentication in the handshake performed in step S4 of the flowchart. The information of a communication device indicated in a transmission destination list is, for example, a uniform resource locator (URL). The control unit 33 of the client-side communication control apparatus 30 permits communication with a communication destination in a case where the URL of the communication destination is a URL registered in the transmission destination list, and does not permit communication in a case where the URL of the communication destination is not registered in the transmission destination list.

Furthermore, the control unit 33 may update the transmission destination list. For example, the control unit 33 stores the URL of a communication destination for which communication with the client apparatus 10 was permitted in a certain period and a communication destination URL for which communication with the client apparatus 10 was not permitted. Then, the control unit 33 updates the transmission destination list by, for example, registering again the URL of a communication destination that performed communication in a certain period among URLs registered in the transmission destination list. Alternatively, the client-side communication control apparatus 30 may transmit, to the communication control management apparatus 50, a communication destination URL for which communication was permitted in a certain period and a communication destination URL for which communication was not permitted. In this case, for example, the communication control management apparatus 50 may update the transmission destination list based on a communication destination URL that performed communication with the client-side communication control apparatus 30. By the transmission destination list being updated by the communication control management apparatus 50, the communication control management apparatus 50 can collectively manage communication devices that communicate with the client-side communication control apparatus 30 under management.

Furthermore, the client-side communication control apparatus 30 may verify whether the content of the information (for example, firmware update program) transmitted to the client apparatus 10 after the handshake performed in step S4 is established is correct. For example, in a case where the firmware update program of the client apparatus 10 is transmitted via the network NW, the control unit 33 of the client-side communication control apparatus 30 performs verification using a key for verification (verification key). In this case, the communication control management apparatus 50 may transmit the verification key to each of the client-side communication control apparatus 30 and the server-side communication control apparatus 31, for example.

For example, the server-side communication control apparatus 31 generates a hash value from the information (plaintext) transmitted to the client apparatus 10, and encrypts the generated hash value using the verification key. Then, the server-side communication control apparatus 31 further encrypts the plaintext and the encrypted hash value using the secret key and transmits the encrypted plaintext and hash value to the client apparatus 10. Furthermore, the client-side communication control apparatus 30 decrypts the information using the common key, and acquires the plaintext and the encrypted hash value.

Furthermore, the client-side communication control apparatus 30 generates a hash value from the acquired plaintext, and decrypts the encrypted hash value using the verification key. In a case where the hash value generated from the plaintext is equal to the decrypted hash value, the client-side communication control apparatus 30 determines that the information transmitted to the client apparatus 10 is correct content. In this case, the client-side communication control apparatus 30 outputs the decrypted information (plaintext) to the client apparatus 10. On the other hand, in a case where the hash value generated from the plaintext is not equal to the decrypted hash value, the client-side communication control apparatus 30 determines that there is a possibility that the information transmitted to the client apparatus 10 is unauthorized information transmitted from an unauthorized communication apparatus disguised as the server apparatus 20 or the server-side communication control apparatus 31. In this case, the client-side communication control apparatus 30 does not output the decrypted information (plaintext) to the client apparatus 10.

As a result, the client apparatus 10 can receive only information that was verified to be correct content that was verified. Furthermore, normally, it is considered that whether the content of an update program in updating the firmware is correct is determined by the client apparatus 10, but the processing load of the client apparatus 10 can be reduced by the server-side communication control apparatus 31 verifying the content of the information transmitted to the client apparatus 10, instead of the client apparatus 10.

As described above, the communication system 1 includes the client-side communication control apparatus 30 connected between the client apparatus 10 and the network NW, and the server-side communication control apparatus 31 connected between the server apparatus 20 and the network NW. The client-side communication control apparatus 30 encrypts information from the client apparatus 10 and transmits the encrypted information to the server-side communication control apparatus 31 via the network NW, and decrypts information from the network NW (information from the server apparatus 20 encrypted by the communication control apparatus 31) and transmits the decrypted information to the client apparatus 10. The server-side communication control apparatus 31 encrypts information from the server apparatus 20 and transmits the encrypted information to the client-side communication control apparatus 30 via the network NW, and decrypts information from the network NW (information from the client apparatus encrypted by the communication control apparatus 30) and transmits the decrypted information to the server apparatus 20.

As a result, the communication system 1 can improve the security of a social infrastructure system without changing the social infrastructure system. This is because image data (so-called plaintext) of the HTTP protocol transmitted from the client apparatus 10 to the server apparatus 20 is combined with, for example, the SSL/TLS protocol by the client-side communication control apparatus 30 and replaced with an HTTPS with improved security. Furthermore, although control data transmitted to the server apparatus 20 or the client apparatus 10 and the like is encrypted, the control data is decrypted by the client-side communication control apparatus 30 and received by the client apparatus 10, and thus, it is not necessary to cause the client apparatus 10 to perform processing of decryption, and an existing apparatus can be used as it is without being changed.

Furthermore, in the communication system 1, since the client-side communication control apparatus 30 and the server-side communication control apparatus 31 perform mutual authentication, security can be improved as compared with a case where authentication only in one of directions is performed. In general client terminals and a server apparatus, since an unspecified number of client terminals communicate with the server apparatus, it is not realistic to continue management by issuing valid client certificates to the unspecified number of client terminals. However, in a social infrastructure system or the like to which the communication system is applied, a relationship between the client apparatus 10 and the server apparatus 20 is clearly identified. Therefore, the client-side communication control apparatus 30 and the server-side communication control apparatus 31 can perform mutual authentication, and security can be improved.

In general, a client terminal that does not include a client certificate may be required to input an ID and a password issued by a server apparatus in order to communicate with the server apparatus. In such password authentication, in order to maintain security, a long character string in which characters and numbers are combined may be required for the password, or periodic password change or the like may be required. However, in a case where the number of passwords to be memorized increases, management is troublesome, and there was a case where a password is rather leaked, for example, a case where a password is left in a memo or recorded in a web browser.

On the other hand, in the communication system 1, since the client-side communication control apparatus 30 includes a client certificate, mutual authentication can be reliably performed with the server apparatus 20. Therefore, password authentication is unnecessary. Therefore, the trouble of inputting a password and the trouble of periodically changing and managing a password are eliminated, and convenience for a user is improved. That is, security can be maintained without a burden being imposed on a user.

Furthermore, in a system in which a client terminal that does not include a client certificate communicates with a server apparatus based on authentication using an ID and a password, anyone can communicate with the server apparatus as long as the ID and the password can be correctly input. Therefore, a client terminal can be taken over without authorization and the server apparatus can be accessed without authorization. For example, there is a possibility of being infected with ransomware in which a function of a client terminal is restricted by a server apparatus taken over without authorization and a ransom is required for releasing the function.

On the other hand, in the communication system 1, the client apparatus 10 and the server apparatus 20 are not taken over without authorization by mutual authentication being performed between the client apparatus 10 and the server apparatus 20 via the communication control apparatus 30 (31). That is, the communication system 1 can also take measures against ransomware.

Furthermore, for example, in a case where there is a terminal without an administrator (also referred to as a stray device) in the network, there is a case where the terminal is taken over without authorization and is used as an unauthorized terminal that performs an attack such as malware. On the other hand, in the communication system 1, mutual authentication is performed between the client apparatus 10 and the server apparatus 20 via the communication control apparatus 30 (31), so that infection with malware or the like can be prevented even in a case where a terminal without an administrator in the network NW is taken over without authorization and used for an attack.

Furthermore, in the communication system 1, the server apparatus 20 is connected to the server-side communication control apparatus 31, and authentication processing is not performed in the server apparatus 20. Therefore, it is not necessary to hold a certificate or the like in the server apparatus 20, and it is made clear that the server apparatus 20 connected to the server-side communication control apparatus 31 is managed by the communication control management apparatus 50. In a case where the server apparatus 20 already includes a functional unit corresponding to the server-side communication control apparatus 31, the server-side communication control apparatus 31 does not necessarily need to be physically connected between the server apparatus 20 and the network NW. In this case, authentication processing with the client-side communication control apparatus 30 is performed by the functional unit corresponding to the server-side communication control apparatus 31 already included in the server apparatus 20.

In the communication system 1, the control unit 401 of the IC card 40 performs at least one of mutual authentication or encryption/decryption processing. Therefore, the apparatus cost of the communication control apparatus 30 (31) can be reduced.

Furthermore, although an example was described in which the IC card 40 attached to the communication control apparatus 30 (31) performs at least one of mutual authentication or encryption/decryption processing in the communication system 1, the configuration for performing mutual authentication and encryption/decryption processing in the communication system 1 is not limited to an IC card. Furthermore, the IC card 40 may be any functional unit as long as the functional unit includes a storage function of storing a secret key and a client certificate (or server certificate) and a processing function of performing at least one of mutual authentication or encryption/decryption processing, and may be, for example, a SIM card in which an IC chip is included, or the form of a card may not be adopted.

Furthermore, in the communication system 1, the IC card 40 of the client-side communication control apparatus 30 is detachably attached to the client-side communication control apparatus 30. As a result, since the IC card 40 and the client-side communication control apparatus 30 can be separated in the communication system 1, in a case where either one is replaced, only the one device is required to be replaced. For example, in a case where the IC card 40 and the client-side communication control apparatus 30 are integrated and a portion corresponding to the IC card 40 is replaced, the entire client-side communication control apparatus 30 needs to be replaced, and as compared with this case, the maintenance cost in a case where a specific portion such as the IC card 40 included in the client-side communication control apparatus 30 is replaced can be reduced in the communication system 1.

Furthermore, the communication system 1 further includes the communication control management apparatus 50, and the communication control management apparatus 50 transmits a secret key and a client certificate that the IC card 40 attached to the client-side communication control apparatus 30 is caused to store to the client-side communication control apparatus 30, and transmits a secret key and a server certificate that the IC card 40 attached to the server-side communication control apparatus 31 is caused to store to the server-side communication control apparatus 31. As a result, the communication system 1 can determine a common key by performing handshake using a valid secret key and a certificate issued by the communication control management apparatus 50, and security of a social infrastructure system can be further improved in addition to the effects described above.

Note that the configuration of the communication system 1 is not limited to the example described above. For example, the communication control apparatus 30 (31) may use a hardware security module (HSM) that implements a function of the communication control apparatus 30 (31) by hardware based on a processing load. That is, the configuration of the communication control apparatus 30 (31) is not necessarily limited to the configuration in which an IC card is attached as long as secure processing is possible, and a configuration using an IC chip or an IC module capable of implementing the function of the communication control apparatus 30 (31) may be adopted.

Furthermore, in the communication system 1, secure communication using the SSL/TLS protocol may be always performed, or whether to perform communication using the SSL/TLS protocol may be selectable. Furthermore, only communication in one direction of bidirectional communication between the client apparatus 10 and the server apparatus 20 may be communication using the SSL/TLS protocol. Furthermore, secure communication using the SSL/TLS protocol may be always performed, or whether to perform communication using the SSL/TLS protocol may be selectable.

By communication using the SSL/TLS protocol being always performed, communication from an apparatus different from the valid communication control apparatus 30 (31) authenticated by the communication control apparatus 30 (31) can be blocked. Therefore, unauthorized access to the client apparatus 10 and the server apparatus 20 and infection of the client apparatus 10 and the server apparatus 20 with malware can be eliminated.

Furthermore, in the communication system 1, communication using the SSL/TLS protocol may be always performed, and unauthorized access to the client apparatus 10 and the server apparatus 20 may be stored. In this case, a record of an unauthorized access may be transmitted to the communication control management apparatus 50. The communication control management apparatus 50 can recognize the presence or absence of unauthorized access, and can detect a sign stage before a large-scale attack on the entire system is started and a countermeasure can be taken.

Furthermore, in the communication system 1, the communication control apparatus 30 (31) may periodically check whether connection with the client apparatus 10 or the server apparatus 20 to which the own apparatus is connected is maintained. In this case, information indicating a connection state may be transmitted to the communication control management apparatus 50. For example, in a case where the information indicating a connection state cannot be received from the communication control apparatus 30 (31), the communication control management apparatus 50 determines that the communication control apparatus 30 (31) is disconnected from the client apparatus 10 or the server apparatus 20, and invalidates the disconnected communication control apparatus 30 (31). In this way, the communication control management apparatus 50 prevents the disconnected communication control apparatus 30 (31) from being connected to an unauthorized apparatus and being abused for impersonation.

Furthermore, in the communication system 1, a chip having high tamper resistance called a secure element that acquired common criteria/ISO15408 (CC) authentication may be included in the IC card 40 attached to the communication control apparatus 30 (31). By a certificate including a secret key and a public key being caused to be stored using this chip, very high security can be maintained.

Furthermore, in the communication system 1, a program of the client apparatus 10 may be updated from the server apparatus 20, the communication control management apparatus 50, or the like via the communication control apparatus 30 (31). The function of the client apparatus 10 can be securely updated by program update (update of the firmware) being performed via the communication control apparatus 30 (31). In a case where the firmware is transmitted from the server apparatus 20 to the client apparatus 10 in this manner, the firmware transmitted from the server apparatus 20 is given a signature of the server apparatus 20 encrypted by the server-side communication control apparatus 31, for example. In this case, the signature is decrypted by the client-side communication control apparatus 30 in the client apparatus 10, so that it can be determined that the transmitted firmware is certainly the firmware transmitted from the server apparatus 20. As a result, even in a case where unauthorized firmware is transmitted to the client apparatus 10 from an unauthorized terminal pretending to be the server apparatus 20, erroneous update based on the unauthorized firmware for the client apparatus 10 can be eliminated.

Furthermore, since the firmware can be securely updated from the server apparatus 20, the communication control management apparatus 50, or the like for the client apparatus 10 by communication being performed via the communication control apparatus 30 (31) in this manner, the work cost can be also reduced as compared with a case where a worker physically moves to places where a plurality of client apparatuses 10 is installed for each of the client apparatuses 10 and performs firmware update work.

Furthermore, in the communication system 1, the client apparatus 10 may be started or stopped from the server apparatus 20, the communication control management apparatus 50, or the like via the communication control apparatus 30 (31). By starting or stopping (remote activation) being performed via the communication control apparatus 30 (31), the function of the client apparatus 10 can be securely updated, and secure remote control can be implemented.

Furthermore, in the communication system 1, the case where the client apparatus 10 and the server apparatus 20 communicate by wire was described as an example, but the present invention is not limited thereto. At least one of the client apparatus 10 or the server apparatus 20 may be an apparatus that performs wireless communication by a wireless local area network (LAN) or the like. For example, in a case where the client apparatus 10 communicates with the server apparatus 20 by wireless communication, the client-side communication control apparatus 30 includes a wireless communication function, encrypts data transmitted by the client apparatus 10, and transmits the encrypted data to the server apparatus 20 by wireless communication.

Note that an example in which the client-side communication control apparatus 30 communicates with the server-side communication control apparatus 31 in the communication system 1 was described, but the communication destination of the client-side communication control apparatus 30 is not limited thereto. For example, the client-side communication control apparatus 30-1 may communicate with the client-side communication control apparatus 30-2. In the case of receiving a cue for communication start from the client-side communication control apparatus 30-2, the client-side communication control apparatus 30-1 first performs mutual authentication with the client-side communication control apparatus 30-2, and confirms that the client-side communication control apparatus 30-2 is a valid communication terminal. Then, in a case where the mutual authentication is correctly performed, the client-side communication control apparatus 30-1 outputs information received from the client-side communication control apparatus 30-2 to the client apparatus 10. By an authenticator being given to transmission data using encryption, tampering of communication information can be detected and the sender can be identified. Therefore, in the communication system 1, it is possible to ensure that "data that is not tampered with is received" "from a correct party" in communication between the client-side communication control apparatus 30 and the server-side communication control apparatus 31 and communication between client-side communication control apparatuses 30.

First Embodiment

Next, a communication system according to a first embodiment will be described.

FIG. 8 is a diagram illustrating a configuration example of a communication system 1 according to the first embodiment. Each hardware configuration and the like of the communication system 1 illustrated in FIG. 8 are as described above.

As illustrated in FIG. 8, a communication control apparatus 30-1 (first communication control apparatus) is connected between a network connection apparatus 7 (switch or the like) and a client apparatus 10-1 (first client apparatus). A communication control apparatus 30-2 (second communication control apparatus) is connected between the network connection apparatus 7 and a client apparatus 10-2 (second client apparatus). Similarly, a communication control apparatus 30-N (N-th communication control apparatus) is connected between the network connection apparatus 7 and a client apparatus 10-N (N-th client apparatus). For example, a client apparatus 10 is an IoT device. Furthermore, a communication control management apparatus 50 is connected to the network connection apparatus 7 and manages communication by the communication control apparatus 30-1 and the communication control apparatus 30-2. That is, the communication control apparatus 30-N and the communication control management apparatus 50 are disposed so as to sandwich the network connection apparatus 7.

For example, the communication control management apparatus 50 transmits a control command to the communication control apparatus 30-N and causes generation of a packet including a predetermined VLAN tag. The VLAN tag includes identification information such as an ID. Furthermore, the communication control management apparatus 50 detects a communication abnormality based on communication content reported from the communication control apparatus 30-N. For example, the communication abnormality is an attack on a network by a third party, and includes tampering of data and the like.

An NW communication unit 32 of the communication control apparatus 30-1 receives a control command from the communication control management apparatus 50. A control unit 33 (first processor) of the communication control apparatus 30-1 generates a packet PA1 (first packet) including a VLAN tag TG1 (first virtual tag) according to a control command or the like from the communication control management apparatus 50. An apparatus communication unit 34 (first interface) of the communication control apparatus 30-1 mediates communication between the client apparatus 10-1 and another client apparatus (for example, client apparatus 10-2) by transmitting and receiving the packet PA1 including the VLAN tag TG1.

For example, in a case where the client apparatus 10-1 and the client apparatus 10-2 are registered in a transmission destination list (communication permission list) stored in a storage unit 36, the control unit 33 permits communication between the client apparatus 10-1 and the client apparatus 10-2. The apparatus communication unit 34 receives data transmitted from the client apparatus 10-1, the control unit 33 generates the packet PA1 including the VLAN tag TG1 based on the received data, and the apparatus communication unit 34 transmits the generated packet PA1 to the client apparatus 10-2. Note that the communication control apparatus 30-1 may control the client apparatus 10-1, and the data transmitted from the client apparatus 10-1 may be the packet PA1 including the VLAN tag TG1.

An NW communication unit 32 of the communication control apparatus 30-2 receives a control command from the communication control management apparatus 50. A control unit 33 (second processor) of the communication control apparatus 30-2 generates the packet PA1 (first packet) including the VLAN tag TG1 (first virtual tag) according to a control command or the like from the communication control management apparatus 50. An apparatus communication unit 34 (second interface) of the communication control apparatus 30-2 mediates communication between the client apparatus 10-2 and another client apparatus (for example, client apparatus 10-1) by transmitting and receiving the packet PA1 including the VLAN tag TG1.

For example, in a case where the client apparatus 10-1 and the client apparatus 10-2 are registered in a transmission destination list (communication permission list) stored in a storage unit 36, the control unit 33 permits communication between the client apparatus 10-1 and the client apparatus 10-2. The apparatus communication unit 34 receives data transmitted from the client apparatus 10-2, the control unit 33 generates the packet PA1 including the VLAN tag TG1 based on the received data, and the apparatus communication unit 34 transmits the generated packet PA1 to the client apparatus 10-1. Note that the communication control apparatus 30-2 may control the client apparatus 10-2, and the data transmitted from the client apparatus 10-2 may be the packet PA1 including the VLAN tag TG1.

A control unit 510 of the communication control management apparatus 50 generates a packet PA2 (second packet) including a VLAN tag TG2 (second virtual tag) for performing communication with each communication control apparatus 30-N. An NW communication unit 500 of the communication control management apparatus 50 communicates with each communication control apparatus 30-N by the packet PA2 including the VLAN tag TG2. For example, the NW communication unit 500 communicates with the communication control apparatus 30-1 or the communication control apparatus 30-2 by the packet PA2 including the VLAN tag TG2.

The control unit 510 also monitors communication between the client apparatuses 10 (10-1 to 10-N) based on management information defining regular communication between the client apparatuses 10 as communication by the packet PA1 including the VLAN tag TG1. The control unit 510 also monitors communication between the communication control management apparatus 50 and the communication control apparatuses 30 (30-1 to 30-N) based on management information defining regular communication between the communication control management apparatus 50 and the communication control apparatuses 30 as communication by the packet PA2 including the VLAN tag TG2. The management information is stored in a storage unit 520 or the like.

As described above, communication paths are logically separated in the communication system 1 by the communication control apparatuses 30 and the communication control management apparatus 50 communicating by a packet including a VLAN tag, and security is improved. In the first embodiment, constant communication between the client apparatuses 10 is executed in a virtual communication path VP1 identified by the VLAN tag TG1, and communication of a control command and alert information between the communication control management apparatus 50 and the communication control apparatuses 30 is executed in a virtual communication path VP2 identified by the VLAN tag TG2. As described above, by the communication paths VP1 and VP2 being logically separated, a contradiction can be detected in a case where the contradiction occurs between a path that is subjected to a man-in-the-middle attack and a path that is not subjected to the man-in-the-middle attack, and which communication path is subjected to the man-in-the-middle attack can be easily identified. Furthermore, other communication paths can be protected by the attacked communication path being blocked.

Figure 9:
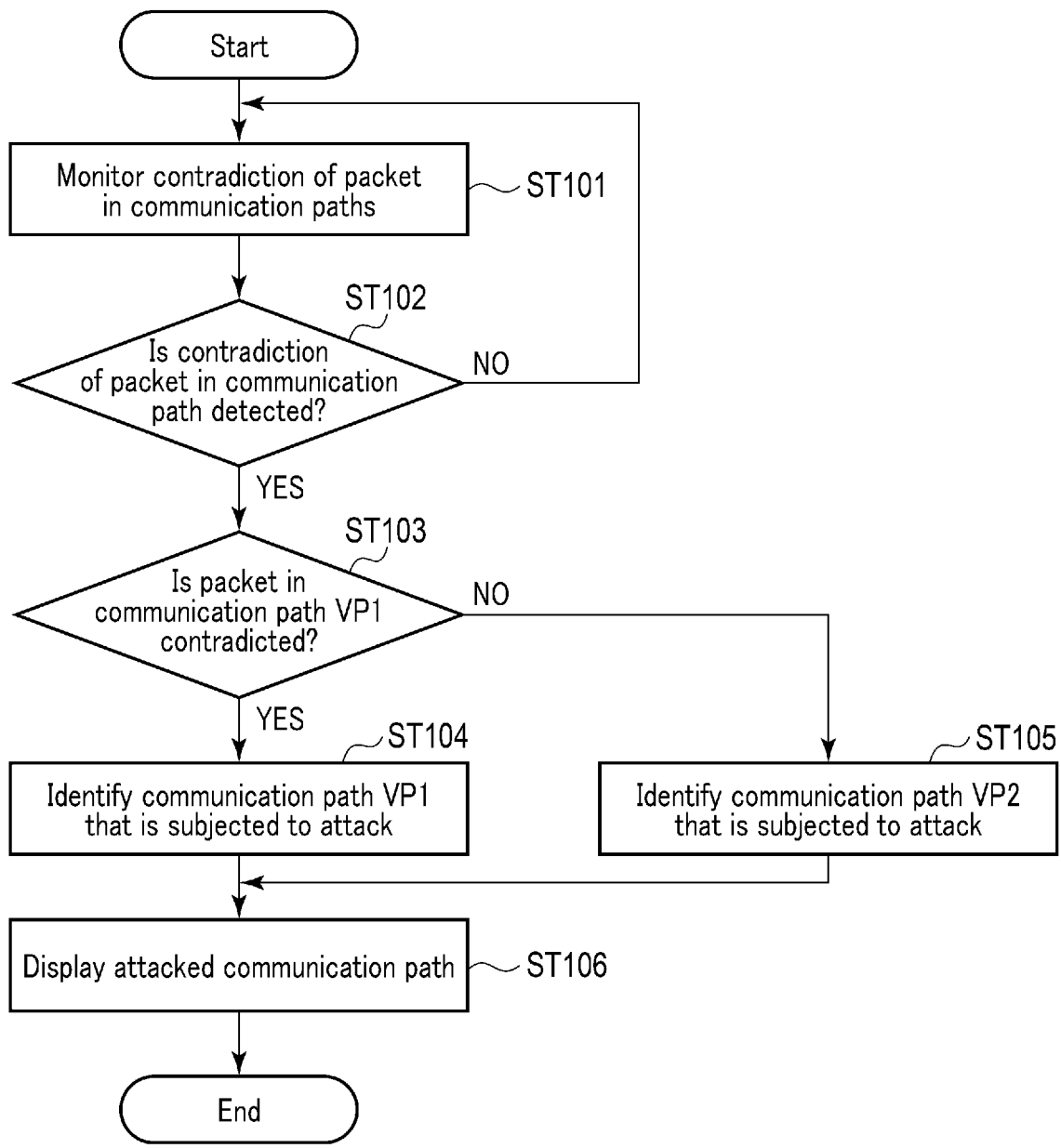
FIG. 9 is a flowchart illustrating an example of communication monitoring by the communication system according to the first embodiment.

FIG. 9 is a flowchart illustrating an example of communication monitoring by the communication system 1 according to the first embodiment.

The control unit 510 of the communication control management apparatus 50 monitors a communication abnormality of the communication paths. For example, the communication abnormality is an attack on a network by a third party, and includes tampering of data and the like. The control unit 510 confirms that communication is performed by the client apparatuses 10 permitted to communicate based on a transmission destination list (communication permission list) stored in the storage unit 520, and monitors a contradiction of a packet based on VLAN tags included in packets of the communication paths (ST101). For example, in a case where no contradiction of a packet is detected (ST102, NO), the control unit 510 determines that there is no abnormality in the communication paths and continues monitoring (ST101). In a case where a contradiction of a packet in a communication path is detected (ST102, YES), the control unit 510 proceeds to processing according to the contradiction detection. Note that in a case where the control unit 510 cannot confirm that the communication is by a client apparatus 10 permitted to communicate, the control unit determines that the communication is unauthorized and disconnects the communication.

For example, the control unit 510 monitors the communication path VP1 based on management information defining regular communication of the communication path VP1 between the client apparatuses 10 (10-1 to 10-N) as communication by the packet PA1 including the VLAN tag TG1. The control unit 510 also monitors the communication path VP2 based on management information defining regular communication between the communication control management apparatus 50 and the communication control apparatuses 30 (30-1 to 30-N) as communication by the packet PA2 including the VLAN tag TG2.

In a case where a VLAN tag detected from a packet in the communication path VP1 is different from the VLAN tag TG1, the control unit 510 detects a contradiction of the packet in the communication path VP1 (ST103, YES) and identifies the communication path VP1 that is subjected to an attack (ST104). The control unit 510 gives an instruction for outputting of warning information indicating that the communication path VP1 is attacked, and a display unit 530 displays the warning information indicating that the communication path VP1 is attacked (ST106). The control unit 510 may also block communication of the communication path VP1 in order to protect the network from the attack.

Furthermore, in a case where a VLAN tag detected from a packet in the communication path VP2 is different from the VLAN tag TG2, the control unit 510 detects a contradiction of the packet in the communication path VP2 (ST103, NO) and identifies the communication path VP2 that is subjected to an attack (ST105). The control unit 510 gives an instruction for outputting of warning information indicating that the communication path VP2 is attacked, and the display unit 530 displays the warning information indicating that the communication path VP2 is attacked (ST105). The control unit 510 may block communication of the communication path VP2 in order to protect the network from the attack.

Second Embodiment

Next, a communication system according to a second embodiment will be described.

In the communication system 1 according to the first embodiment, the communication control management apparatus 50 makes a communication path between the two client apparatuses 10 and communication paths between the communication control management apparatus 50 and the client apparatuses 10 different from each other, and identifies an attacked communication path. In a communication system 1 according to second embodiment described here, a communication control management apparatus 50 makes a communication path between two client apparatuses 10 and a communication path VP2 between the communication control management apparatus 50 and a client apparatus 10 different from each other, further makes communication paths between the communication control management apparatus 50 and the client apparatuses 10 different from each other, and identifies an attacked communication path. In the description of the second embodiment, differences from the first embodiment will be mainly described, and common portions will be appropriately omitted.

FIG. 10 is a diagram illustrating a configuration example of the communication system 1 according to the second embodiment. Each hardware configuration and the like of the communication system 1 illustrated in FIG. 10 are as described above.

A control unit 510 of the communication control management apparatus 50 generates different packets including individual VLAN tags for performing communication with respective communication control apparatuses 30-N. That is, the control unit 510 generates a packet PA2 (second packet) including a VLAN tag TG2 (second virtual tag) for communicating with a communication control apparatus 30-1, and generates a packet PA3 (third packet) including a VLAN tag TG3 (third virtual tag) for communicating with a communication control apparatus 30-2. An NW communication unit 500 of the communication control management apparatus 50 communicates with the communication control apparatuses 30-N by the different packets including the individual VLAN tags. That is, the NW communication unit 500 communicates with the communication control apparatus 30-1 by the packet PA2 including the VLAN tag TG2, and communicates with the communication control apparatus 30-2 by the packet PA3 including the VLAN tag TG3.

The control unit 510 also monitors communication between the client apparatuses 10 (10-1 to 10-N) based on management information defining regular communication between the client apparatuses 10 as communication by a packet PA1 including a VLAN tag TG1. The control unit 510 also monitors communication between the communication control management apparatus 50 and the communication control apparatus 30-1 and monitors communication between the communication control management apparatus 50 and the communication control apparatus 30-2 based on management information defining regular communication between the communication control management apparatus 50 and the communication control apparatus 30-1 as communication by the packet PA2 including the VLAN tag TG2 and defining regular communication between the communication control management apparatus 50 and the communication control apparatus 30-2 as communication by the packet PA3 including the VLAN tag TG3.

As described above, communication paths are logically separated in the communication system 1 by the communication control apparatuses 30 and the communication control management apparatus 50 communicating by a packet including a VLAN tag, and security is improved. In the second embodiment, constant communication between the client apparatuses 10 is executed in a communication path VP1 identified by the VLAN tag TG1, communication of a control command and alert information between the communication control management apparatus 50 and the communication control apparatus 30-1 is executed in a communication path VP2 identified by the VLAN tag TG2, and communication of a control command and alert information between the communication control management apparatus 50 and the communication control apparatus 30-2 is executed in a communication path VP3 identified by the VLAN tag TG3. As described above, by the communication paths VP1, VP2, and VP3 being logically separated, a contradiction can be detected in a case where the contradiction occurs between a path that is subjected to a man-in-the-middle attack and a path that is not subjected to the man-in-the-middle attack, and which communication path is subjected to the man-in-the-middle attack can be easily identified. Furthermore, other communication paths can be protected by the attacked communication path being blocked.

Figure 11:
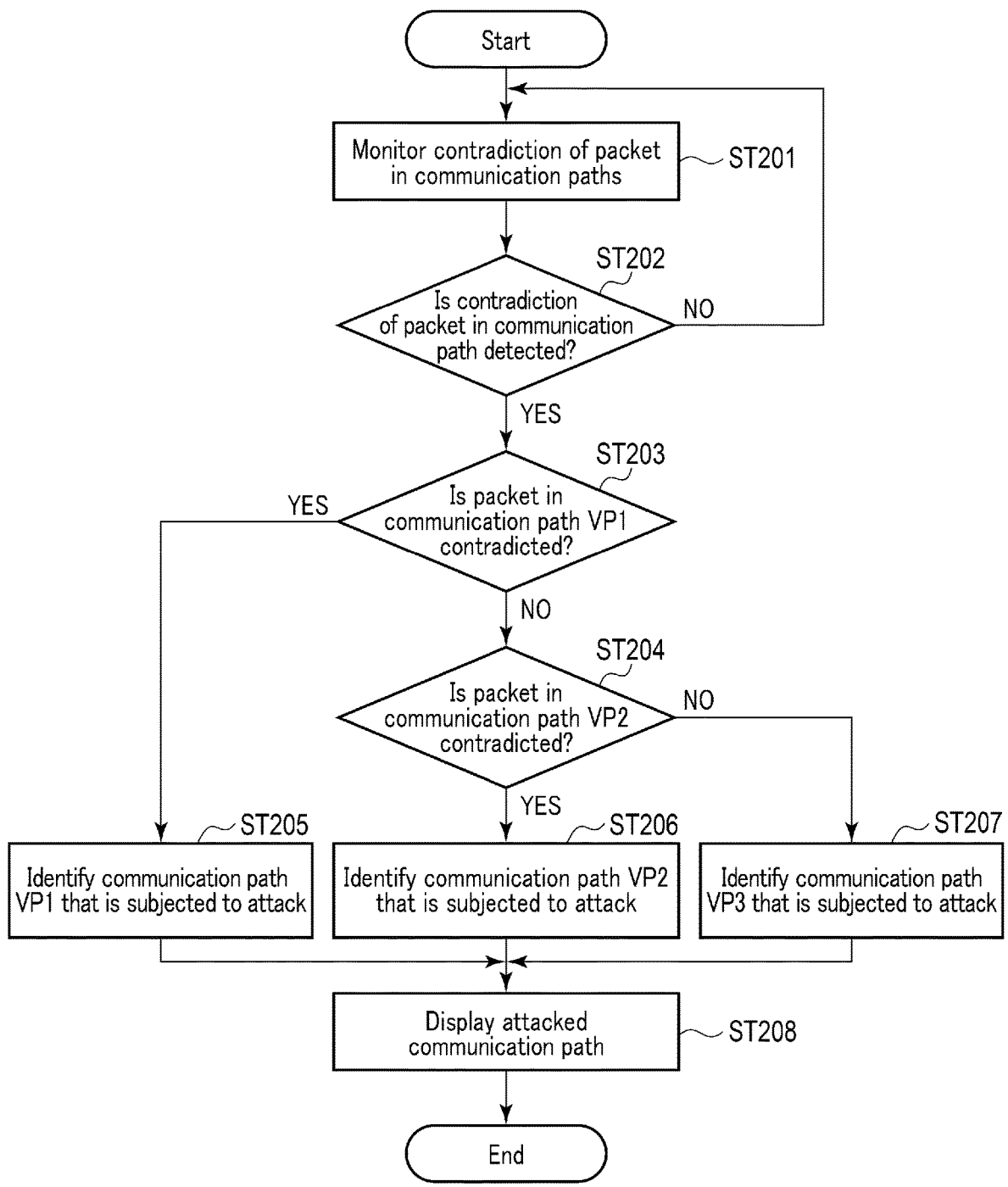
FIG. 11 is a flowchart illustrating an example of communication monitoring by the communication system according to the second embodiment.

FIG. 11 is a flowchart illustrating an example of communication monitoring by the communication system 1 according to the second embodiment.

The control unit 510 of the communication control management apparatus 50 monitors a communication abnormality of the communication paths. For example, the communication abnormality is an attack on a network by a third party, and includes tampering of data and the like. The control unit 510 confirms that communication is performed by the client apparatuses 10 permitted to communicate based on a transmission destination list (communication permission list) stored in a storage unit 520, and monitors a contradiction of a packet based on VLAN tags included in packets of the communication paths (ST201). For example, in a case where no contradiction of a packet is detected (ST202, NO), the control unit 510 determines that there is no abnormality in the communication paths and continues monitoring (ST201). In a case where a contradiction of a packet in a communication path is detected (ST202, YES), the control unit 510 proceeds to processing according to the contradiction detection. Note that in a case where the control unit 510 cannot confirm that the communication is by a client apparatus 10 permitted to communicate, the control unit determines that the communication is unauthorized and disconnects the communication.

For example, the control unit 510 monitors the communication path VP1 based on management information defining regular communication of the communication path VP1 between the client apparatuses 10 (10-1 to 10-N) as communication by the packet PA1 including the VLAN tag TG1. The control unit 510 also monitors the communication path VP2 based on management information defining regular communication between the communication control management apparatus 50 and the communication control apparatus 30-1 as communication by the packet PA2 including the VLAN tag TG2. The control unit 510 also monitors the communication path VP3 based on management information defining regular communication between the communication control management apparatus 50 and the communication control apparatus 30-2 as communication by the packet PA3 including the VLAN tag TG3.

In a case where a VLAN tag detected from a packet in the communication path VP1 is different from the VLAN tag TG1, the control unit 510 detects a contradiction of the packet in the communication path VP1 (ST203, YES) and identifies the communication path VP1 that is subjected to an attack (ST205). The control unit 510 gives an instruction for outputting of warning information indicating that the communication path VP1 is attacked, and a display unit 530 displays the warning information indicating that the communication path VP1 is attacked (ST208). The control unit 510 may also block communication of the communication path VP1 in order to protect the network from the attack.

Furthermore, in a case where a VLAN tag detected from a packet in the communication path VP2 is different from the VLAN tag TG2, the control unit 510 detects a contradiction of the packet in the communication path VP2 (ST204, YES) and identifies the communication path VP2 that is subjected to an attack (ST206). The control unit 510 gives an instruction for outputting of warning information indicating that the communication path VP2 is attacked, and the display unit 530 displays the warning information indicating that the communication path VP2 is attacked (ST208). The control unit 510 may block communication of the communication path VP2 in order to protect the network from the attack.

Furthermore, in a case where a VLAN tag detected from a packet in the communication path VP3 is different from the VLAN tag TG3, the control unit 510 detects a contradiction of the packet in the communication path VP3 (ST204, NO) and identifies the communication path VP3 that is subjected to an attack (ST207). The control unit 510 gives an instruction for outputting of warning information indicating that the communication path VP3 is attacked, and the display unit 530 displays the warning information indicating that the communication path VP3 is attacked (ST208). The control unit 510 may block communication of the communication path VP3 in order to protect the network from the attack.

Third Embodiment

Next, a communication system according to a third embodiment will be described.

The third embodiment is implemented in combination with the first and second embodiments. In the third embodiment, a communication system 1 generates one or more dummy communication paths.

For example, the communication system 1 generates a dummy communication path between a communication control management apparatus 50 and client apparatuses 10. That is, a dummy communication path is generated in parallel with a regular communication path VP2. For example, a control unit 510 of the communication control management apparatus 50 generates a packet PA4 (fourth packet) including a VLAN tag TG4 (fourth virtual tag). An NW communication unit 500 of the communication control management apparatus 50 communicates with each communication control apparatus 30-N by the packet PA4 including the VLAN tag TG4 using the dummy communication path. An attacker cannot distinguish between regular communication paths VP1 and VP2 and the dummy communication path. Therefore, by the dummy communication path being generated, the risk that the regular communication paths VP1 and VP2 are attacked can be reduced.

Furthermore, the communication system 1 may generate different dummy communication paths between the communication control management apparatus 50 and the client apparatuses 10. That is, a dummy communication path is generated in parallel with each of the regular communication paths VP2 and VP3. The control unit 510 of the communication control management apparatus 50 generates the packet PA4 (fourth packet) including the VLAN tag TG4 (fourth virtual tag). The NW communication unit 500 of the communication control management apparatus 50 communicates with each communication control apparatus 30-1 by the packet PA4 including the VLAN tag TG4 using a dummy communication path. Similarly, the control unit 510 generates a packet PA5 (fifth packet) including a VLAN tag TG5 (fifth virtual tag). The NW communication unit 500 of the communication control management apparatus 50 communicates with each communication control apparatus 30-2 by the packet PA5 including the VLAN tag TG5 using a dummy communication path. An attacker cannot distinguish between regular communication paths VP1, VP2, and VP3 and the dummy communication paths. Therefore, by the dummy communication paths being generated, the risk that the regular communication paths VP1 and VP2 are attacked can be reduced.

Furthermore, the communication system 1 may generate a different dummy communication path between the client apparatuses 10. That is, a dummy communication path is generated in parallel with the regular communication path VP1. A control unit 33 of the communication control apparatus 30-1 generates the packet PA4 (fourth packet) including the VLAN tag TG4 (fourth virtual tag). The apparatus communication unit 34 communicates with each communication control apparatus 30-2 by the packet PA4 including the VLAN tag TG4 using the dummy communication path. Furthermore, the control unit 33 of the communication control apparatus 30-2 generates the packet PA4 (fourth packet) including the VLAN tag TG4 (fourth virtual tag). The apparatus communication unit 34 communicates with each communication control apparatus 30-1 by the packet PA4 including the VLAN tag TG4 using the dummy communication path. An attacker cannot distinguish between regular communication paths VP1 and VP2 and the dummy communication path. Therefore, by the dummy communication path being generated, the risk that the regular communication paths VP1 and VP2 are attacked can be reduced.

According to the first to third embodiments described above, a communication system and a program excellent in detecting unauthorized access without changing an existing device can be provided. In the communication system 1 according to each of the embodiments, the communication paths between the apparatuses are set to be logically different communication paths using VLAN tags. For example, even in a case where a packet of a communication path is falsified by an attack, the communication path subjected to the attack can be identified from a contradiction of the packet, and the communication path subjected to the attack can be blocked. Note that a case where identification information such as a VLAN tag is used as a means for constructing logically different communication paths was described, but the present embodiment is not limited thereto, and fraud may be detected using an internet protocol (IP) address or the like.

Furthermore, a program according to the present embodiment may be transferred in a state of being stored in an electronic device, or may be transferred in a state of not being stored in an electronic device. In the latter case, the program may be transferred via a network or may be transferred in a state of being stored in a storage medium. The storage medium is a non-transitory tangible medium. The storage medium is a computer readable medium, and is read and executed by each apparatus included in the communication system 1. The storage medium may be any medium that can store a program such as a CD-ROM or a memory card and can be read by a computer, and its form is any form.

Although some embodiments of the present invention were described, these embodiments were presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

The invention claimed is:

1. A communication system comprising: a first communication control apparatus connected between a network connection apparatus and a first client apparatus; a second communication control apparatus connected between the network connection apparatus and a second client apparatus; and a communication control management apparatus that is connected to the network connection apparatus and manages communication by the first communication control apparatus and second communication control apparatus,
   wherein the first communication control apparatus includes:
   a first processor that generates a first packet including a first virtual tag; and
   a first interface that mediates communication between the first client apparatus and the second client apparatus by transmitting and receiving the first packet,
   the second communication control apparatus includes:
   a second processor that generates the first packet including the first virtual tag; and
   a second interface that mediates communication between the first client apparatus and the second client apparatus by transmitting and receiving the first packet, and
   the communication control management apparatus includes:
   a third processor that generates a second packet including a second virtual tag; and
   a third interface that communicates with the first communication control apparatus or the second communication control apparatus by the second packet,
   wherein the third processor monitors communication based on management information defining regular communication between the first client apparatus and the second client apparatus as communication by the first packet including the first virtual tag, and defining regular communication between the communication control management apparatus and the first communication control apparatus or second communication control apparatus as communication by the second packet including the second virtual tag.

2. The communication system according to claim 1, wherein, in a case where a virtual tag detected from a packet of a first communication path between the first client apparatus and the second client apparatus contradicts the first virtual tag, the third processor detects an abnormality of the first communication path.

3. The communication system according to claim 2, wherein, in a case where a virtual tag detected from a packet of a second communication path between the communication control management apparatus and the first communication control apparatus or a packet of a second communication path between the communication control management apparatus and the second communication control apparatus contradicts the second virtual tag, the third processor detects an abnormality of the second communication path.

4. The communication system according to claim 3, wherein the communication control management apparatus includes a display unit that displays an abnormality of the first or second communication path.

5. The communication system according to claim 3, wherein the first communication path is a virtual communication path identified by the first virtual tag, and the second communication path is a virtual communication path identified by the second virtual tag.

6. The communication system according to claim 1, wherein the communication control management apparatus includes a memory that stores a communication permission list including identification information for identifying the first client apparatus and the second client apparatus, and
the third processor permits communication between the first client apparatus and the second client apparatus based on the communication permission list.

7. The communication system according to claim 1, wherein communication between the first client apparatus and the second client apparatus is transmission and reception of information generated by the first client apparatus or the second client apparatus, and
communication between the communication control management apparatus and the first client apparatus or the second client apparatus is transmission and reception of a control command or a communication alert.

8. A non-transitory computer-readable storage medium that stores a program that a first communication control apparatus connected between a network connection apparatus and a first client apparatus, a second communication control apparatus connected between the network connection apparatus and a second client apparatus, and a communication control management apparatus that is connected to the network connection apparatus and manages communication by the first communication control apparatus and second communication control apparatus are caused to execute, wherein the program causes the first communication control apparatus to execute a procedure of generating a first packet including a first virtual tag; and a procedure of mediating communication between the first client apparatus and the second client apparatus by transmitting and receiving the first packet, the second communication control apparatus to execute a procedure of generating the first packet including the first virtual tag; and a procedure of mediating communication between the first client apparatus and the second client apparatus by transmitting and receiving the first packet, and the communication control management apparatus to execute a procedure of generating a second packet including a second virtual tag;

a procedure of communicating with the first communication control apparatus or the second communication control apparatus by the second packet; and a procedure of monitoring communication based on management information defining regular communication between the first client apparatus and the second client apparatus as communication by the first packet including the first virtual tag, and defining regular communication between the communication control management apparatus and the first communication control apparatus or second communication control apparatus as communication by the second packet including the second virtual tag.

9. A communication system comprising: a first communication control apparatus connected between a network connection apparatus and a first client apparatus; a second communication control apparatus connected between the network connection apparatus and a second client apparatus; and a communication control management apparatus that is connected to the network connection apparatus and manages communication of the first communication control apparatus and second communication control apparatus, wherein the first communication control apparatus includes:

a first processor that generates a first packet including a first virtual tag; and a first interface that mediates communication between the first client apparatus and the second client apparatus by transmitting and receiving the first packet, the second communication control apparatus includes:

a second processor that generates the first packet including the first virtual tag; and a second interface that mediates communication between the first client apparatus and the second client apparatus by transmitting and receiving the first packet, and the communication control management apparatus includes:

a third processor that generates a second packet including a second virtual tag and generates a third packet including a third virtual tag; and a third interface that communicates with the first communication control apparatus by the second packet and communicates with the second communication control apparatus by the third packet, wherein the third processor monitors communication based on management information defining regular communication between the first client apparatus and the second client apparatus as communication by the first packet including the first virtual tag, defining regular communication between the communication control management apparatus and the first communication control apparatus as communication by the second packet including the second virtual tag, and defining regular communication between the communication control management apparatus and the second communication control apparatus as communication by the third packet including the third virtual tag.

* * * * *